(12) United States Patent
Ito et al.

(10) Patent No.: US 12,276,863 B2
(45) Date of Patent: Apr. 15, 2025

(54) OPTICAL SYSTEM AND IMAGE PICKUP APPARATUS

(71) Applicant: CANON KABUSHIKI KAISHA, Tokyo (JP)

(72) Inventors: Satoshi Ito, Tochigi (JP); Mikio Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 623 days.

(21) Appl. No.: 17/547,275

(22) Filed: Dec. 10, 2021

(65) Prior Publication Data

US 2022/0221687 A1  Jul. 14, 2022

(30) Foreign Application Priority Data

Jan. 13, 2021 (JP) .................................. 2021-003690
Oct. 27, 2021 (JP) .................................. 2021-175257

(51) Int. Cl.
| | |
|---|---|
| *G02B 9/12* | (2006.01) |
| *G02B 5/00* | (2006.01) |
| *G02B 13/00* | (2006.01) |
| *H04N 23/50* | (2023.01) |
| *H04M 1/02* | (2006.01) |

(52) U.S. Cl.
CPC .............. *G02B 9/12* (2013.01); *G02B 5/005* (2013.01); *G02B 13/0085* (2013.01); *H04N 23/50* (2023.01); *H04M 1/0202* (2013.01); *H04N 23/555* (2023.01)

(58) Field of Classification Search
CPC ...... G02B 9/12; G02B 5/005; G02B 13/0085; G02B 13/0035; H04N 23/50; H04N 23/555; H04M 1/0202
See application file for complete search history.

(56) References Cited

U.S. PATENT DOCUMENTS

| | | |
|---|---|---|
| 9,651,722 B2 | 5/2017 | Ito et al. |
| 9,798,115 B1 | 10/2017 | Yin et al. |
| 9,835,821 B1 | 12/2017 | Yin et al. |

(Continued)

FOREIGN PATENT DOCUMENTS

| | | |
|---|---|---|
| JP | H10-170821 A | 6/1998 |
| JP | 2000-187155 A | 7/2000 |
| JP | 2020-181092 A | 11/2020 |

OTHER PUBLICATIONS

Notice of Reasons for Refusal issued by the Japanese Patent Office on May 21, 2024 in corresponding JP Patent Application No. 2021-175257, with English translation.

(Continued)

*Primary Examiner* — James C. Jones
(74) *Attorney, Agent, or Firm* — Carter, DeLuca & Farrell LLP

(57) ABSTRACT

An optical system includes, in order from an object side to an image side, a first unit, a second unit, and a third unit. The first unit includes a first substrate, and a first lens having a negative refractive power and disposed on the image side of the first substrate. The second unit includes a second substrate, and a second lens having a positive refractive power and disposed on the object side of the second substrate. The third unit includes a third substrate, and a third lens having a positive refractive power and disposed on the object side of the third substrate.

20 Claims, 18 Drawing Sheets

(56) References Cited

U.S. PATENT DOCUMENTS

| | | | |
|---|---|---|---|
| 10,890,698 B2 | 1/2021 | Kobayashi | |
| 2011/0124373 A1 | 5/2011 | Fukuta | |
| 2014/0334016 A1* | 11/2014 | Yin .................... | G02B 13/0045 |
| | | | 359/716 |
| 2019/0113801 A1 | 4/2019 | Ito | |

OTHER PUBLICATIONS

Extended European Search Report issued by the European Patent Office on Jun. 2, 2022 in corresponding EP Patent Application No. 21215536.0.

* cited by examiner

OPTICAL SYSTEM AND IMAGE PICKUP APPARATUS

BACKGROUND OF THE INVENTION

Field of the Invention

The present invention relates to an optical system and an image pickup apparatus.

Description of the Related Art

Small optical systems suitable for medical endoscopes and the like have recently been demanded. In such optical systems, high optical performance is also demanded for accurate diagnoses and treatments. U.S. Pat. No. 9,798,115 discloses a small lens system for medical endoscopes manufactured by a wafer level process.

However, the lens system disclosed in U.S. Pat. No. 9,798,115 increases the cost, due to the large number of substrates and the bonding process in the wafer level process.

SUMMARY OF THE INVENTION

The present invention provides a small and inexpensive optical system having high optical performance, and an image pickup apparatus having the same.

An optical system according to one aspect of the present invention includes, in order from an object side to an image side, a first unit, a second unit, and a third unit. The first unit includes a first substrate, and a first lens having a negative refractive power and disposed on the image side of the first substrate. The second unit includes a second substrate, and a second lens having a positive refractive power and disposed on the object side of the second substrate. The third unit includes a third substrate, and a third lens having a positive refractive power and disposed on the object side of the third substrate. An image pickup apparatus according to another aspect of the present invention includes the above optical system and an image sensor configured to receive an image formed by the optical system.

Further features of the present invention will become apparent from the following description of exemplary embodiments with reference to the attached drawings.

DESCRIPTION OF THE EMBODIMENTS

Figure 1:
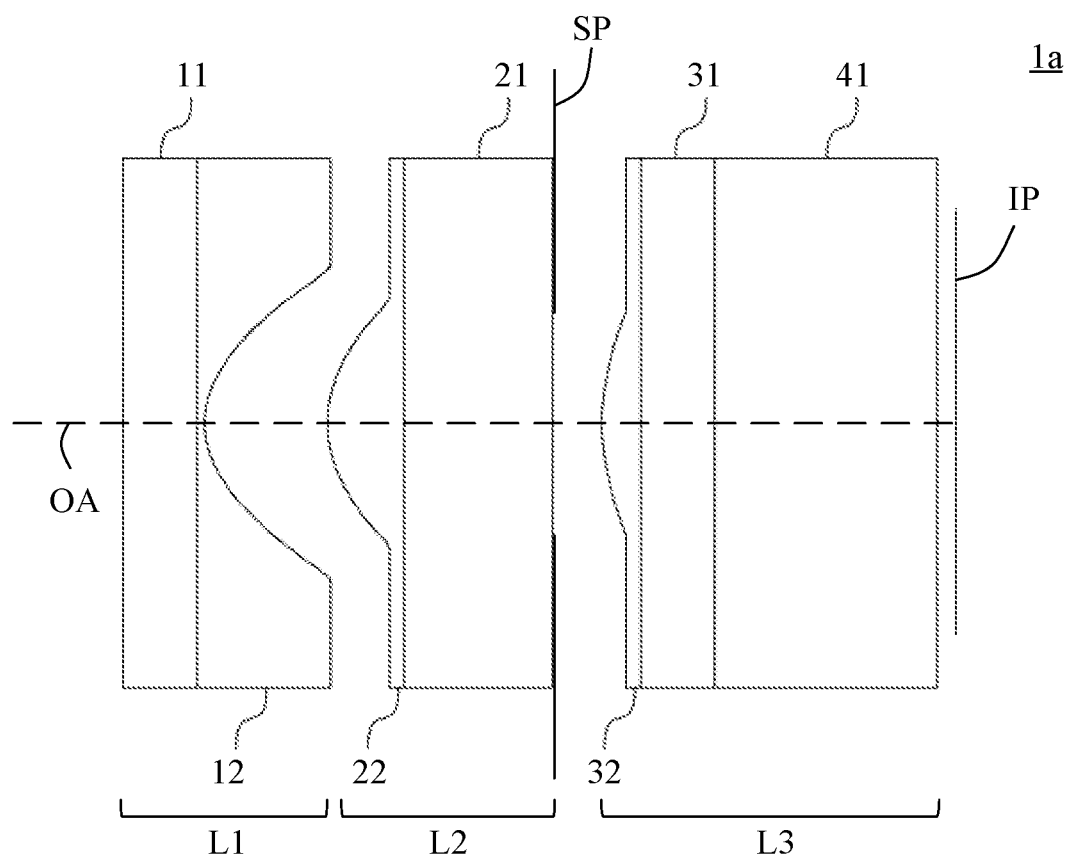
FIG. 1 is a sectional view of an optical system according to Example 1.
Figure 2:
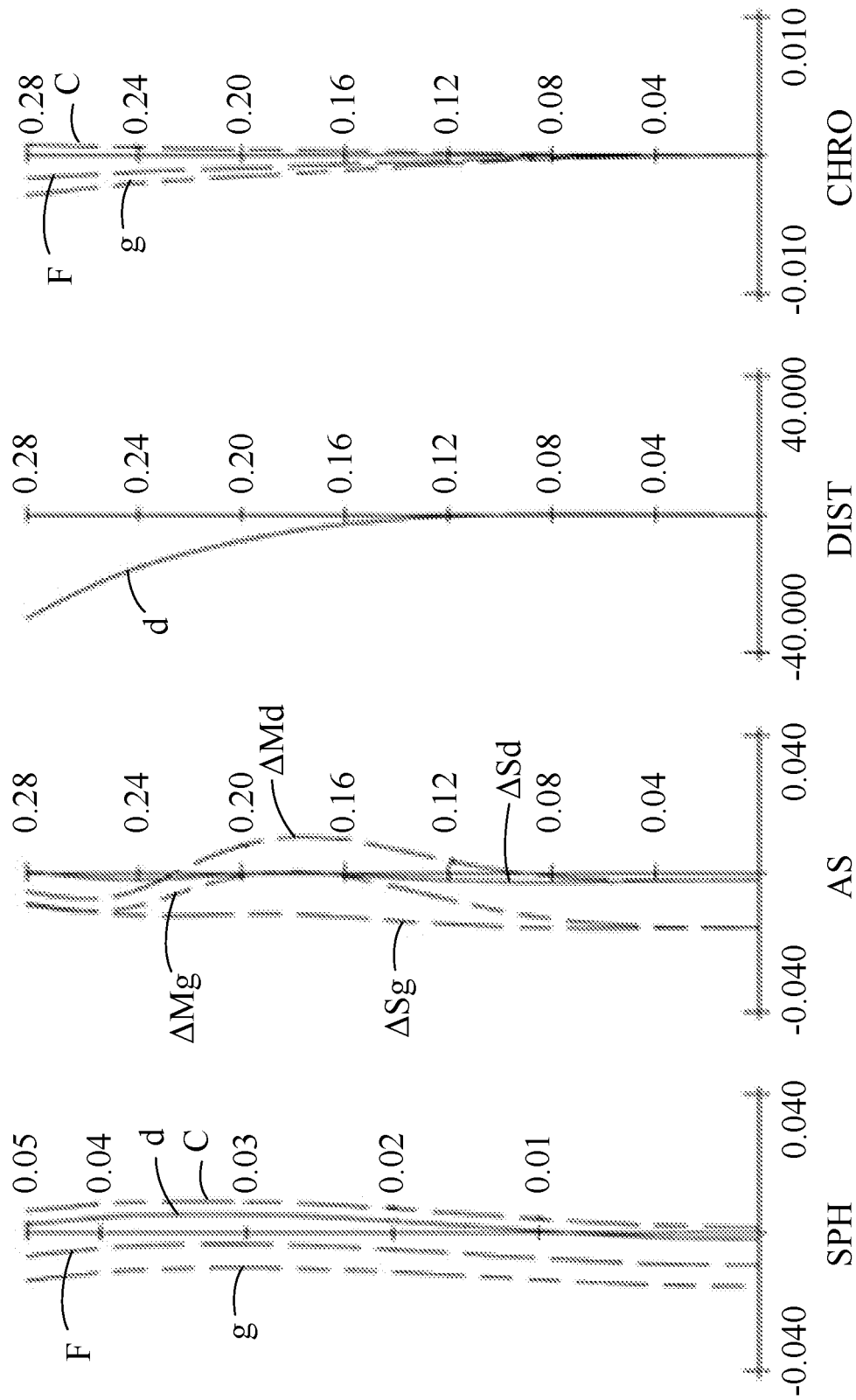
FIGS. 2A to 2D are aberration diagrams of the optical system according to Example 1.

Referring now to the accompanying drawings, a description will be given of embodiments according to the present invention.

An optical system according to each example is a small optical system obtained by using a technology called the wafer level optics. This optical system is called a wafer level lens, and an image pickup apparatus using the wafer level lens for an imaging optical system is called a wafer level camera. The optical system according to each example is suitable for an optical system for a built-in camera of an electronic apparatus such as a mobile phone, a smartphone, or a wearable terminal, or as an objective optical system for an endoscope because of its small size and low cost.

FIGS. 1, 3, 5, 7, 9, 11, 13, and 15 are sectional views of optical systems (wafer level lenses) 1a, 1b, 1c, 1d, 1e, 1f, 1g, and 1h according to Examples 1 to 8, respectively. In each sectional view, a left side is an object side (front) and a right side is an image side (rear). SP denotes a diaphragm (aperture stop), and IP denotes an image plane. Disposed on the image plane IP is an imaging surface of a solid-state image sensor such as a CCD sensor or a CMOS sensor in an image pickup apparatus, or a photosensitive surface corresponding to a film surface of a film-based camera.

FIGS. 2, 4, 6, 8, 10, 12, 14, and 16 are aberration diagrams of the optical systems 1a, 1b, 1c, 1d, 1e, 1f, 1g, and 1h according to Examples 1 to 8, respectively. FIGS. 2A, 4A, 6A, 8A, 10A, 12A, 14A, and 16A are spherical aberration diagrams, FIGS. 2B, 4B, 6B, 8B, 10B, 12B, 14B, and 16B are astigmatism diagrams, FIGS. 2C, 4C, 6C, 8C, 10C, 12C, 14C, and 16C are distortion diagrams, and FIGS. 2D, 4D, 6D, 8D, 10D, 12D, 14D, and 16D are lateral chromatic aberration diagrams. The spherical aberration diagram illustrate spherical aberration amounts for the d-line (wavelength 587.6 nm), the g-line (wavelength 435.8 nm), the C-line (wavelength 656.3 nm), and the F-line (wavelength 486.1 nm), respectively. In the astigmatism diagram, $\Delta Sd$ and $\Delta Sg$ denote astigmatism amounts on the sagittal image plane for the d-line and g-line, and $\Delta Md$ and $\Delta Mg$ denote astigmatism amounts on the meridional image plane for the d-line and g-line, respectively. The distortion diagram illustrates a distortion amount for the d-line. The lateral chromatic aberration illustrates chromatic aberration amounts for the g-line, the C-line, and the F-line.

The optical system according to each example includes, in order from an object side to an image side, a first unit L1, a second unit L2, and a third unit L3. The first unit L1 includes a first substrate (front cover glass) 11, and a first lens 12 having a negative refractive power and disposed on the image side of the first substrate 11. The second unit L2 includes a second substrate 21, a second lens 22 having a positive refractive power and disposed on the object side of the second substrate 21, and a diaphragm SP disposed on the image side of the second substrate 21. The third unit L3 includes a third substrate (back cover glass) 31, and a third lens 32 disposed on the object side of the third substrate 31.

In Examples 1 to 3 and 7, a fourth substrate (sensor cover glass) 41 disposed on the image side of the third substrate 31 is provided. In Examples 4 to 6 and 8, the third substrate 31 also serves as a back cover glass and a sensor cover glass.

The first substrate 11 is a flat substrate, and the first lens 12 is a negative lens (plano-concave lens) with a concave surface facing the image side. The first lens 12 is formed on a surface on the image side of the first substrate 11 by using the wafer level process, and is disposed in close contact with the first substrate 11. The second substrate 21 is a flat substrate, and the second lens 22 is a positive lens (plano-convex lens) having a convex surface facing the object side. The second lens 22 is formed on a surface on the object side of the second substrate 21 by using the wafer level process, and is disposed in close contact with the second substrate 21. The third substrate 31 is a flat substrate, and the third lens 32 is a positive lens (plano-convex lens) with a convex surface facing the object side. The third lens 32 is formed on a surface on the object side of the third substrate 31 by using the wafer level process, and is disposed in close contact with the third substrate 31. The fourth substrate (sensor cover glass) 41 is provided to protect the image sensor.

In order to realize a small and inexpensive optical system, each example manufactures the first unit L1, the second unit L2, and the third unit L3 by the wafer level process. That is, each of the first unit L1, the second unit L2, and the third unit L3 is manufactured by forming a lens layer made of a curable resin material on a wafer (flat substrate) made of a glass material. In the second unit L2, the diaphragm SP is formed on the image side of the second substrate 21 by the same wafer process. The first unit L1, the second unit L2, the third unit L3, and the image sensor manufactured by the wafer level process are disposed at desired intervals, adhered outside the effective light diameter, and then cut. Many wafer level lenses can be manufactured.

The material forming the lens layer may be a thermoplastic resin or an ultraviolet curable resin as long as it is a curable resin material. Examples include acrylic resins, silicone resins, and cycloolefin polymers. In each example, each of the first substrate 11, the second substrate 21, and the third substrate 31 is made of glass, and each of the first lens 12, the second lens 22, and the third lens 32 is made of resin, but the present invention is not limited to this example. As long as the first substrate 11 and the first lens 12 have refractive indexes different from each other, for example, both the first substrate 11 and the first lens 12 may be formed of resin. This is similarly applicable to the second unit L2 and the third unit L3.

The diaphragm SP can be formed on the second substrate 21, for example, by vapor-depositing a light-shielding film made of chromium or the like using a mask, or by forming an opening by etching after the vapor deposition. At that time, by forming the diaphragm SP on a flat surface such as a substrate, it becomes easy to control the mask arrangement in the thickness direction, which is advantageous to the manufacture.

The optical system according to each example is an optical system in which the first unit L1, the second unit L2, and the third unit L3 are integrated. By joining the optical system according to each example and the fourth substrate (sensor cover glass) 41, they serve as an imaging system. By forming the lens surface of the third lens 32 on the object side of the third substrate 31 (back cover glass), the back cover glass and the sensor cover glass can be directly joined. This configuration can provide a small optical system having high optical performance while suppressing the costs of materials and manufacturing process (that is, at low cost). The third substrate 31 can be used as the sensor cover glass and the lens surface of the third lens 32 can be formed on the object side of the third substrate 31, which makes inexpensive the manufacturing process.

The optical system according to each example may satisfy at least one of the following inequalities (1a) and (1b).

$$1.00 < f2/f < 1.50 \tag{1a}$$

$$0.60 < f2/f < 1.60 \tag{1b}$$

where f is a focal length of the optical system (entire system), and f2 is a focal length of the second lens 22. The inequality (1a) or (1b) enables the spherical aberration to be corrected a proper value.

The numerical range of the inequality (1a) or (1b) may be set to that in the following inequality (1c).

$$0.75 < f2/f < 1.55 \tag{1c}$$

The numerical range of the inequality (1a) or (1b) may be set to that in the following inequality (1d).

$$0.85 < f2/f < 1.52 \tag{1d}$$

The optical system according to each example may satisfy at least one of the following inequality (2a) and (2b).

$$-2.50 < f3/f1 < -1.80 \tag{2a}$$

$$-3.50 < f3/f1 < -1.50 \tag{2b}$$

where f1 is a focal length of the first lens 12, and f3 is a focal length of the third lens 32. The inequality (2a) or (2b) enables the astigmatism and distortion to be corrected to proper values.

The numerical range of the inequality (2a) or (2b) may be set to that in the following inequality (2c).

$$-3.20 < f3/f1 < -1.60 \tag{2c}$$

The numerical range of the inequality (2a) or (2b) may be set to that in the following inequality (2d).

$$-3.00 < f3/f1 < -1.65 \tag{2d}$$

The optical system according to each example may satisfy the following inequality (3a) or (3b).

$$0.10 < d/f < 0.50 \tag{3a}$$

$$0.07 < d/f < 0.65 \tag{3b}$$

where d is a distance on the optical axis OA from the diaphragm SP to a surface on the object side of the third lens 32. The inequality (3a) or (3b) enables the astigmatism and distortion to be corrected to proper values.

The numerical range of the inequality (3a) or (3b) may be set to that in the following inequality (3c).

$$0.10 < d/f < 0.62 \tag{3c}$$

The optical system according to each example may satisfy the following inequality (4a) or (4b).

$$1.20<L/f<2.40 \quad (4a)$$

$$1.00<L/f<2.40 \quad (4b)$$

where L is a distance from the third lens 32 to the image plane IP. The inequality (4a) or (4b) enables the spherical aberration and the astigmatism to be corrected to proper values.

The numerical range of the inequality (4a) or (4b) may be set to that in the following inequality (4c).

$$1.20<L/f<2.20 \quad (4c)$$

The optical system according to each example is configured to cancel various aberrations between the first lens L12 and the second lens L22 existing on the object side of the diaphragm SP, and to maintain a balance with the aberrations that are generated in the third lens L32 on the image side of the diaphragm SP. Therefore, the following inequality (5) may be satisfied.

$$0.30<(f2-f1)/f3<1.60 \quad (5)$$

If the value is lower than the lower limit in the inequality (5), the refractive power of the third lens L32 becomes small and the balance of the aberration correction before and after the diaphragm SP is lost. On the other hand, if the value is higher than the upper limit in the inequality (5), the refractive power of the third lens L32 becomes large and it becomes difficult to correct various aberrations. In addition, at the same time, the diameter of the third lens L32 becomes so large that it becomes difficult to secure a width outside the effective diameter and the manufacture becomes difficult.

The numerical range of the inequality (5) may be set to that in the following inequality (5a).

$$0.50<(f2-f1)/f3<1.60 \quad (5a)$$

The numerical range of the inequality (5) may be set to that in the following inequality (5b).

$$0.60<(f2-f1)/f3<1.55 \quad (5b)$$

In the optical system according to each example, only the third lens L32 is responsible for the aberration correction on the image side of the diaphragm SP. The outer peripheral portion of the third lens L32 significantly bends the light ray and corrects high-order aberrations. Therefore, the distance d from the diaphragm SP to the third lens L32 and the refractive power of the third lens L32 may be properly set. More specifically, the following inequality (6) may be satisfied.

$$0.03<d/f3<0.40 \quad (6)$$

If the value is lower than the lower limit in the inequality (6), the refractive power of the third lens L32 becomes small, so that it becomes difficult to correct the aberration generated on the image side of the diaphragm SP. On the other hand, if the value is higher than the upper limit in the inequality (6), the angle of light ray incident on the outer peripheral portion of the third lens L32 becomes so gentle that it becomes difficult to correct higher-order aberrations.

The numerical range of the inequality (6) may be set to that in the following inequality (6a).

$$0.04<d/f3<0.35 \quad (6a)$$

The numerical range of the inequality (6) may be set to that in the following inequality (6b).

$$0.05<d/f3<0.34 \quad (6b)$$

Various aberrations may be corrected satisfactorily by satisfying the following inequality (7).

$$1.50<f3/f<3.00 \quad (7)$$

The numerical range of the inequality (7) may be set to that in the following inequality (7a).

$$1.60<f3/f<2.80 \quad (7a)$$

In the wafer level lens manufacturing process according to each example, the first lens L12 and the second lens L22 are structurally opposite to each other via an air layer. Therefore, in joining the first unit L1 including the first lens L12 and the second unit L2 including the second lens L22, it is necessary to bond the outer peripheral portions of the first lens L12 and the second lens L22 to each other. Since the first lens L12 and the second lens L22 are usually made of resin, it is a manufacturing problem to bond the outer peripheral portion of the resin material with high accuracy to suppress deformations and the like. The optical system according to each example makes relatively stronger the refractive powers of the first lens L12 and the second lens L22 to correct higher-order aberrations, so that each lens tends to be larger and a thickness difference between the optical axis and the outer peripheral portion tends to be large.

Therefore, the optical system according to each example may satisfy the following inequality (8).

$$0.60<Lar/(d1+d2)<2.00 \quad (8)$$

where Lar is a distance between the first lens L12 and the second substrate L21, d1 is a thickness of the first substrate L11, and d2 is a thickness of the second substrate L21. If the value is lower than the lower limit in the inequality (8), each of the substrate 1 and the substrate 2 becomes so thick that a small optical system cannot be obtained. On the other hand, if the value is higher than the upper limit in the inequality (8), each of the first substrate L11 and the second substrate L21 becomes so thin that they are easy to deform and the manufacture becomes difficult. Alternatively, as the distance increases between the first lens L12 and the second lens L22 and the second lens L22 becomes thicker, the spherical aberration, astigmatism, and the like increase.

The numerical range of the inequality (8) may be set to that in the following inequality (8a).

$$0.75<Lar/(d1+d2)<1.80 \quad (8a)$$

A detailed description will now be given of the optical system according to each example.

EXAMPLE 1

Referring now to FIGS. 1, 2A to 2D, a description will be given of the optical system 1a according to Example 1 (numerical example 1). As illustrated in FIG. 1, the optical system 1a includes a first unit L1, a second unit L2, and a third unit L3. The first unit L1 includes a first substrate (front cover glass) 11, and a first lens 12 disposed on the image side of it. The first lens 12 is a negative lens with a concave surface facing the image side, and the first lens 12 has a focal length of f1=−0.224 mm. The first lens 12 is formed on the surface on the image side of the first substrate 11 by using the wafer level process. The second unit L2 includes a second substrate 21, and a second lens 22 disposed on the object side of it. The second lens 22 is a positive lens with a convex surface facing the object side, and the second lens 22 has a focal length f2 of f2=0.287 mm. The second lens 22 is formed on the surface on the object side of the second substrate 21 by using the wafer level process. The third unit L3 includes a third substrate (back cover glass) 31, and a third lens 32 disposed on the object side of it. The third lens 32 is a positive lens with a convex surface facing the object side, and the third lens 32 has a focal length f3 of f3=0.508 mm. The third lens 32 is formed on the surface on the object side of the third substrate 31 by using the wafer level process.

In this example, the optical system 1a has a focal length f of f=0.238 mm. A distance d on the optical axis from the diaphragm SP to the third lens 32 is d=0.0657 mm. A distance L from the third lens 32 to the image plane IP is L=0.424 mm. The optical system 1a according to this example is designed to focus on an object at a position 10 mm from the surface closest to the object in the first unit L1.

As illustrated in FIG. 2A, the spherical aberration in this example is less than 0.04 mm. As illustrated in FIG. 2B, the astigmatism in this example is less than 0.04 mm. As illustrated in FIG. 2C, the distortion in this example is less than 40%. As illustrated in FIG. 2D, the lateral chromatic aberration in this example is less than 0.01 mm. Thus, the optical system 1a according to this example has proper aberrations.

EXAMPLE 2

Figure 3:
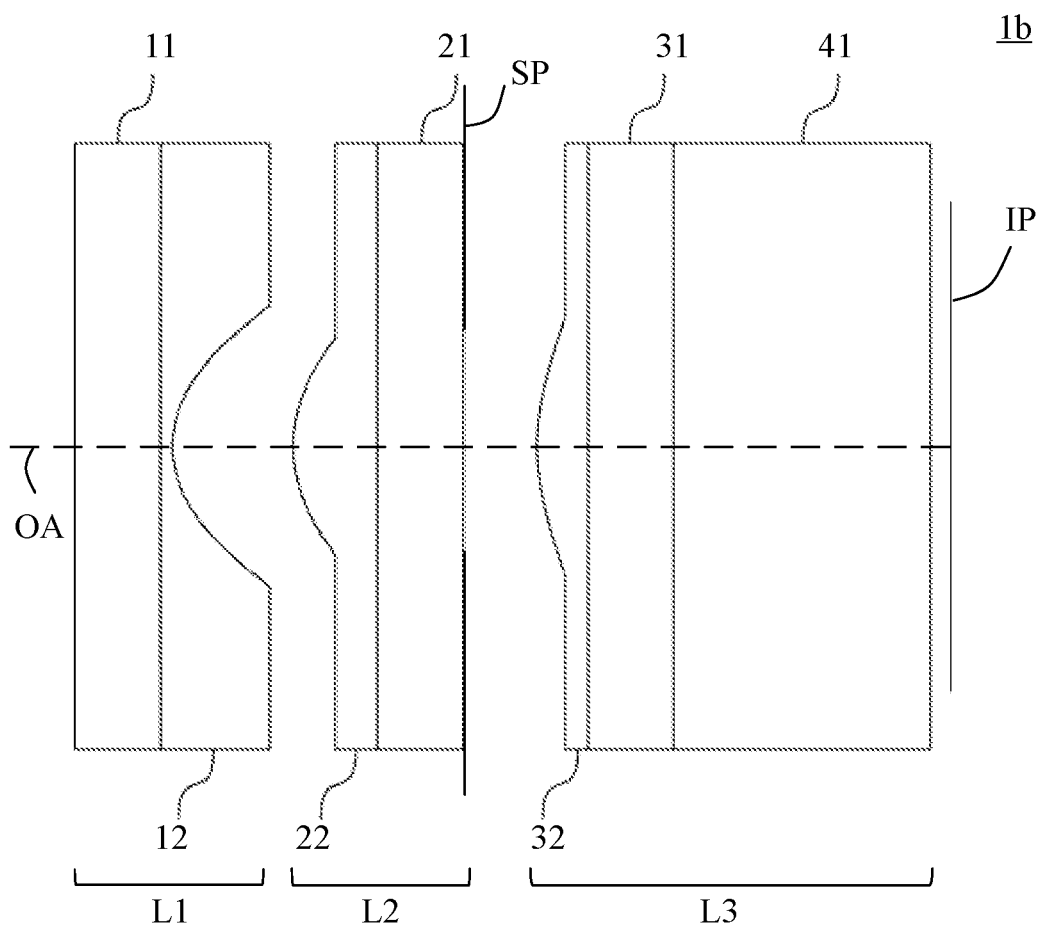
FIG. 3 is a sectional view of an optical system according to Example 2.
Figure 4:
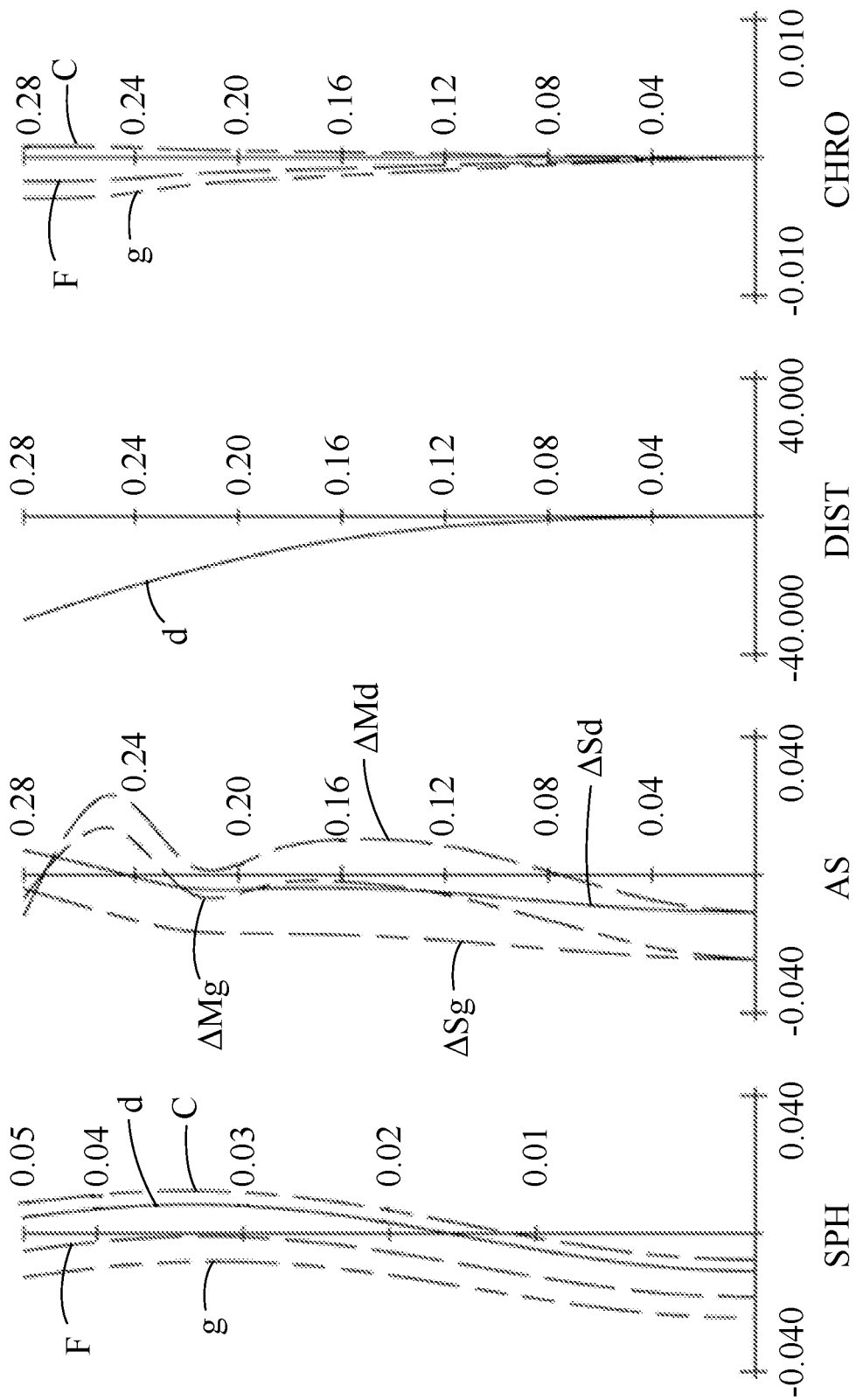
FIGS. 4A to 4D are aberration diagrams of the optical system according to Example 2.

Referring now to FIGS. 3 and 4A to 4D, a description will be given of the optical system 1b according to Example 2 (numerical example 2). As illustrated in FIG. 3, the optical system 1b according to this example has the same basic configuration as that of the optical system 1a of Example 1. The first lens 12 has a focal length f1 of f1=−0.230 mm. The second lens 22 has a focal length f2 of f2=0.283 mm. The third lens 32 has a focal length f3 of f3=0.455 mm. The optical system 1b has a focal length f of f=0.235 mm. A distance d from the diaphragm SP to the third lens 32 is d=0.0865 mm. A distance L from the third lens 32 to the image plane IP is L=0.424 mm. The optical system 1b according to this example is designed to focus on an object at a position 10 mm from the surface closest to the object in the first unit L1.

As illustrated in FIG. 4A, the spherical aberration in this example is less than 0.04 mm. As illustrated in FIG. 4B, the astigmatism in this example is less than 0.04 mm. As illustrated in FIG. 4C, the distortion in this example is less than 40%. As illustrated in FIG. 4D, the lateral chromatic aberration in this example is less than 0.01 mm. Thus, the optical system 1b according to this example has proper aberrations.

EXAMPLE 3

Figure 5:
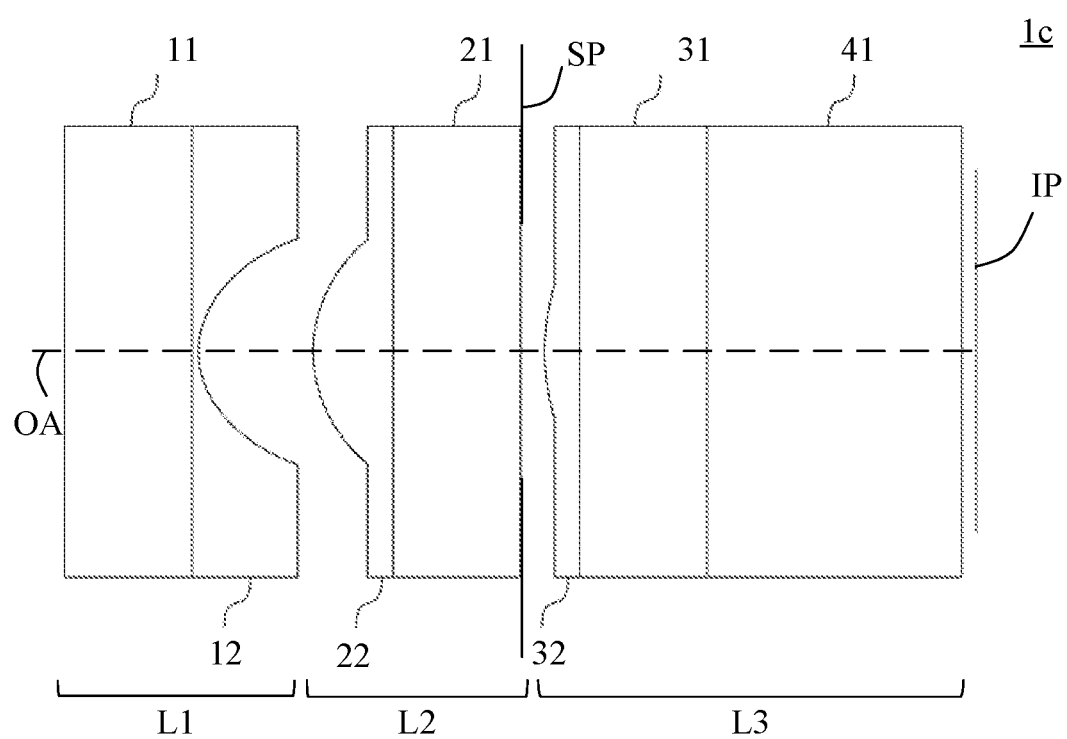
FIG. 5 is a sectional view of an optical system according to Example 3.
Figure 6:
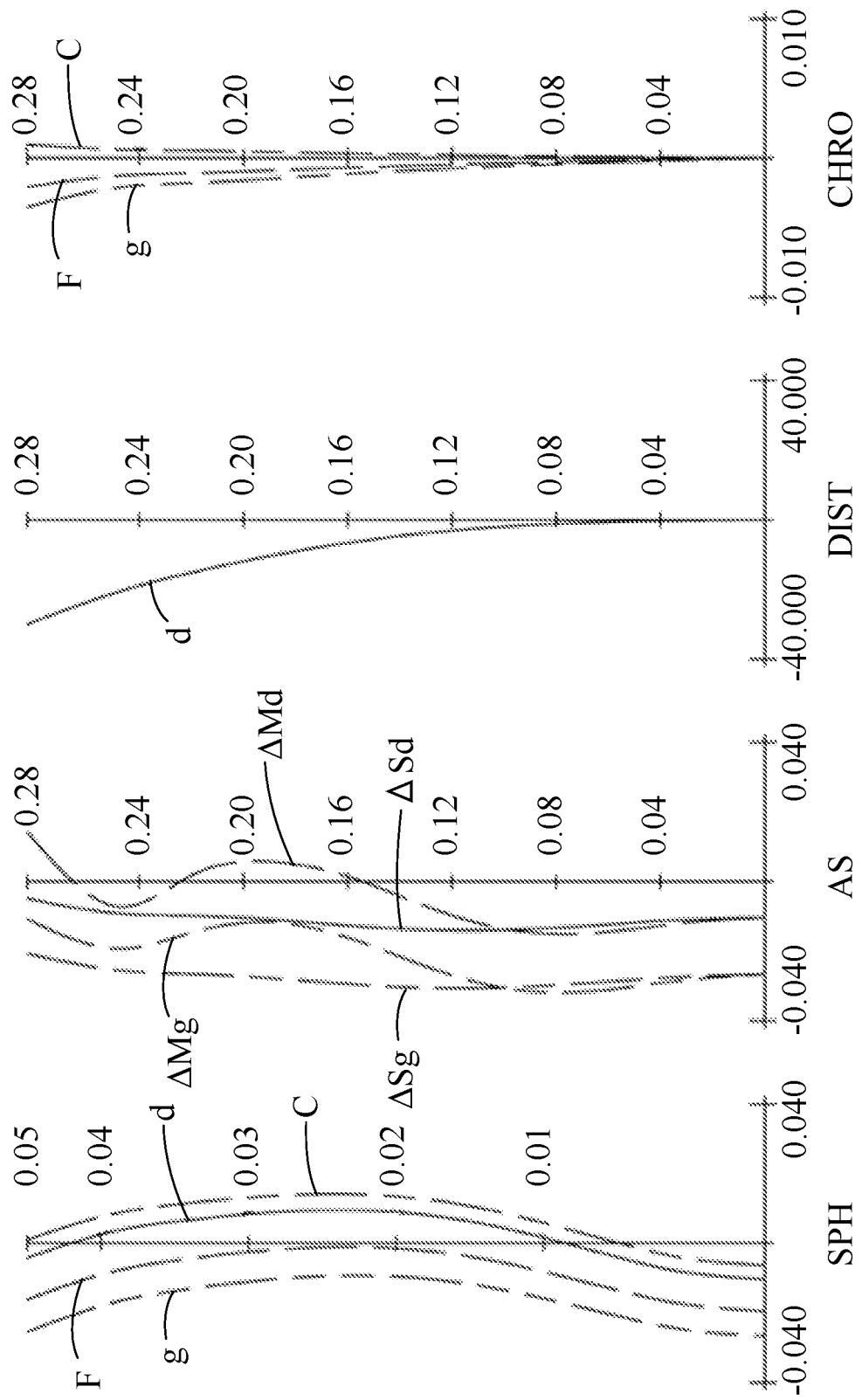
FIGS. 6A to 6D are aberration diagrams of the optical system according to Example 3.

Referring now to FIGS. 5, 6A to 6D, and 17, a description will be given of the optical system 1c according to Example 3 (numerical example 3). As illustrated in FIG. 5, the optical system 1c according to this example has the same basic configuration as that of the optical system 1a of Example 1. The first lens 12 has a focal length f1 of f1=−0.255 mm. The second lens 22 has a focal length f2 of f2=0.372 mm. The third lens 32 has a focal length f3 of f3=0.539 mm.

Figure 17:
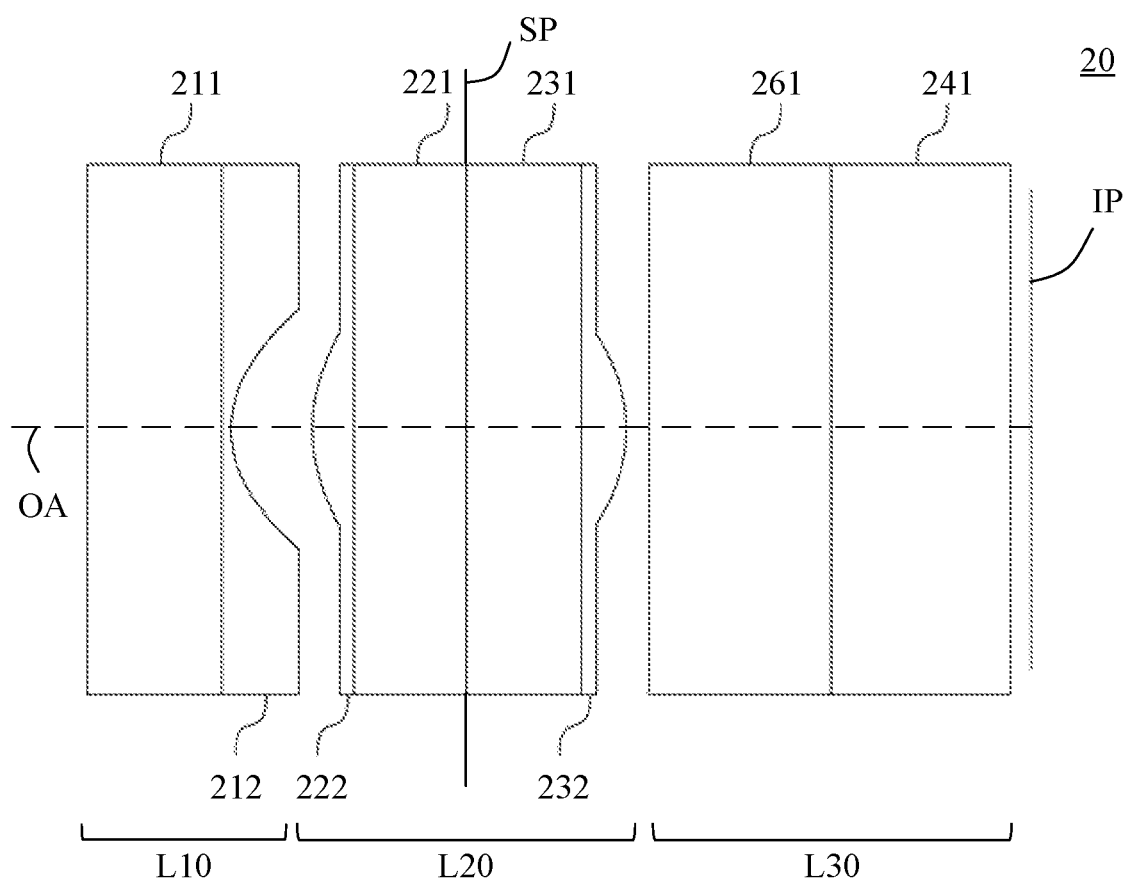
FIG. 17 is a sectional view of an optical system according to a comparative example.

Referring now to FIG. 17, a description will be given of an optical system (wafer level lens) 20 as a comparative example. FIG. 17 is a sectional view of the optical system 20 according to a comparative example. The optical system 20 includes a first unit L10, a second unit L20, and a third unit L30. The first unit L10 includes a first substrate 211, and a first lens 212 disposed on the image side of it. The first lens 212 is a negative lens with a concave surface facing the image side. The second unit L20 includes a second substrate 221, and a second lens 222 disposed on the object side of it. The second lens 222 is a positive lens with a convex surface facing the object side. The second unit L20 includes a third substrate 231, and a third lens 232 disposed on the image side of it. The third lens 232 is a positive lens with a convex surface facing the image side. The second unit L20 includes a diaphragm SP between the second substrate 221 and the third substrate 231. The third unit L30 includes a fourth substrate (back cover glass) 261 and a fifth substrate (sensor cover glass) 241.

On the other hand, the optical system 1c according to this example reduces the number of substrates by using the third substrate 31 required to form the third lens 32 as the back cover glass. Thus, this example can provide a small optical system having high optical performance in which the costs of materials and manufacturing process is reduced, by forming the final lens of the optical system 1c on the object side.

The optical system 1c has a focal length f of f=0.284 mm. A distance d from the diaphragm SP to the third lens 32 is d=0.0379 mm. A distance L from the third lens 32 to the image plane IP is L=0.624 mm. The optical system 1c according to this example is designed to focus on an object at a position 10 mm from the surface closest to the object in the first unit L1.

As illustrated in FIG. 6A, the spherical aberration in this example is less than 0.04 mm. As illustrated in FIG. 6B, the astigmatism in this example is less than 0.04 mm. As illustrated in FIG. 6C, the distortion in this example is less than 40%. As illustrated in FIG. 6D, the lateral chromatic aberration in this example is less than 0.01 mm. Thus, the optical system 1c according to this example has proper aberrations.

EXAMPLE 4

Figure 7:
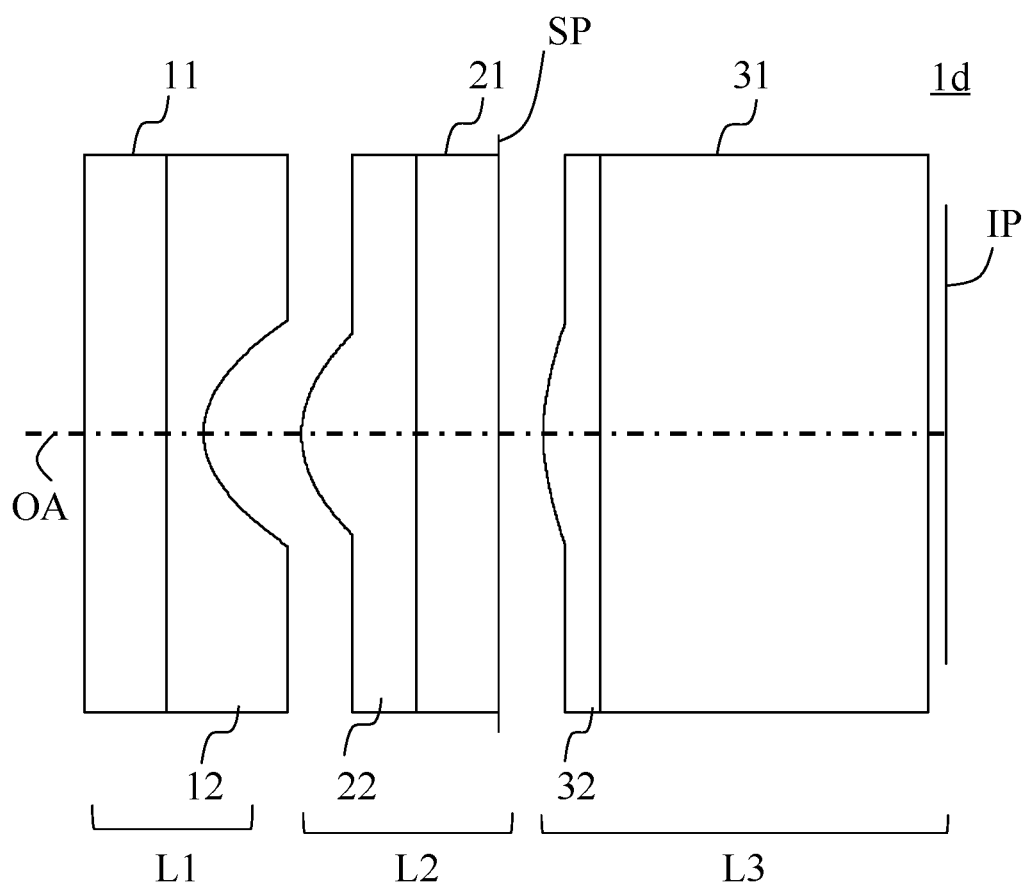
FIG. 7 is a sectional view of an optical system according to Example 4.
Figure 8:
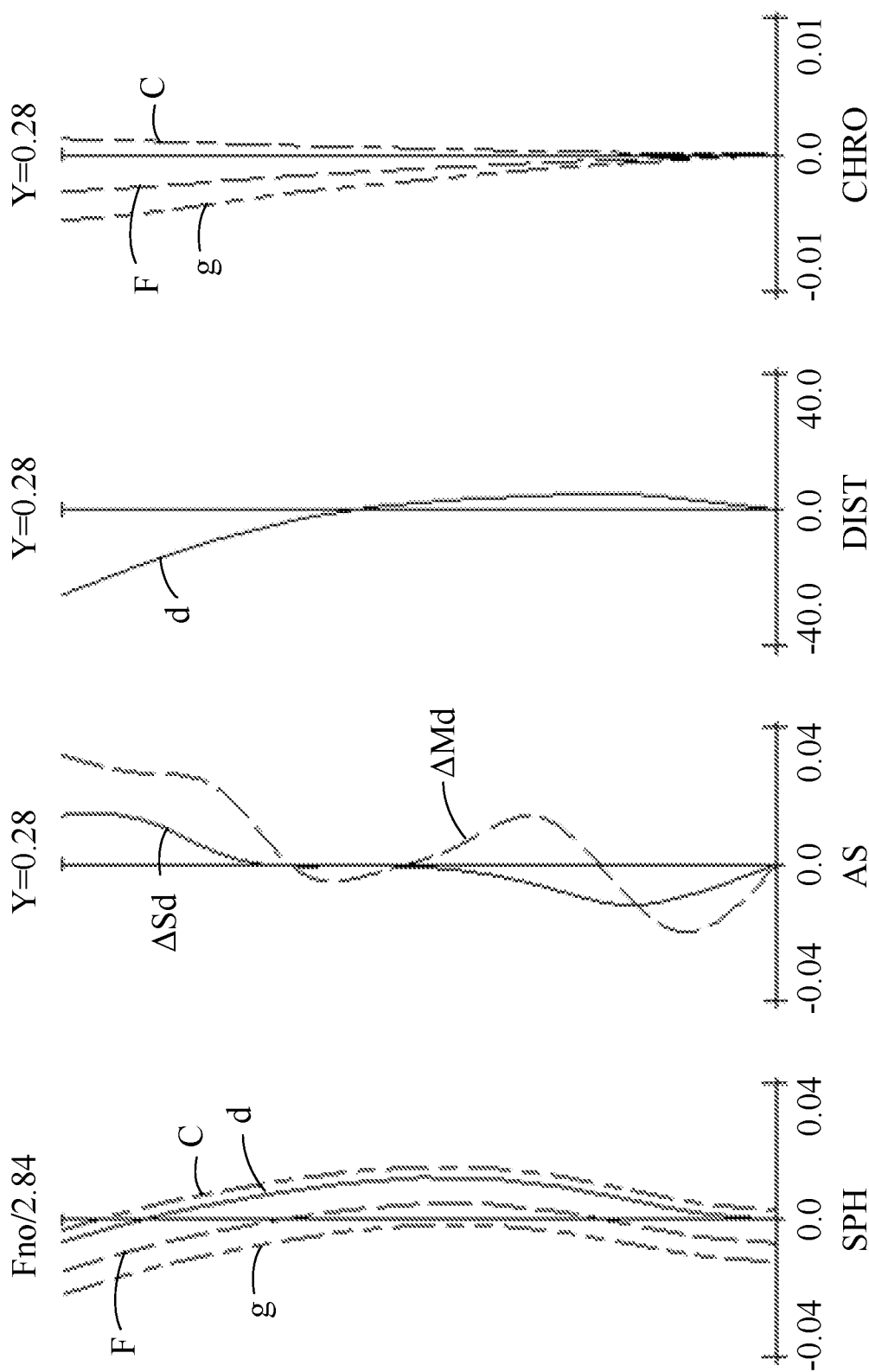
FIGS. 8A to 8D are aberration diagrams of the optical system according to Example 4.

Referring now to FIGS. 7 and 8A to 8D, a description will be given of the optical system 1d according to Example 4 (numerical example 4). As illustrated in FIG. 7, the optical system 1d according to this example has the same basic configuration as that of the optical system 1a of Example 1. In the optical system 1d according to this example, the third substrate 31 is used as the sensor cover glass, and the lens surface of the third lens 32 is formed on the object side of the third substrate 31, and the third substrate 31 serves as the sensor cover glass and the back cover glass. The optical system 1d according to this example has a half angle of view of 59° and an F-number of 2.8, and is an extremely small, bright, and wide-angle optical system. The optical system 1d according to this example is designed to focus on an object at a position 5 mm from the surface closest to the object in the first unit L1.

As illustrated in FIG. 8A, the spherical aberration in this example is less than 0.04 mm. As illustrated in FIG. 8B, the astigmatism in this example is less than 0.04 mm. As illustrated in FIG. 8C, the distortion in this example is less than 40%. As illustrated in FIG. 8D, the lateral chromatic aberration in this example is less than 0.01 mm. Thus, the optical system 1d according to this example has proper aberrations.

EXAMPLE 5

Figure 9:
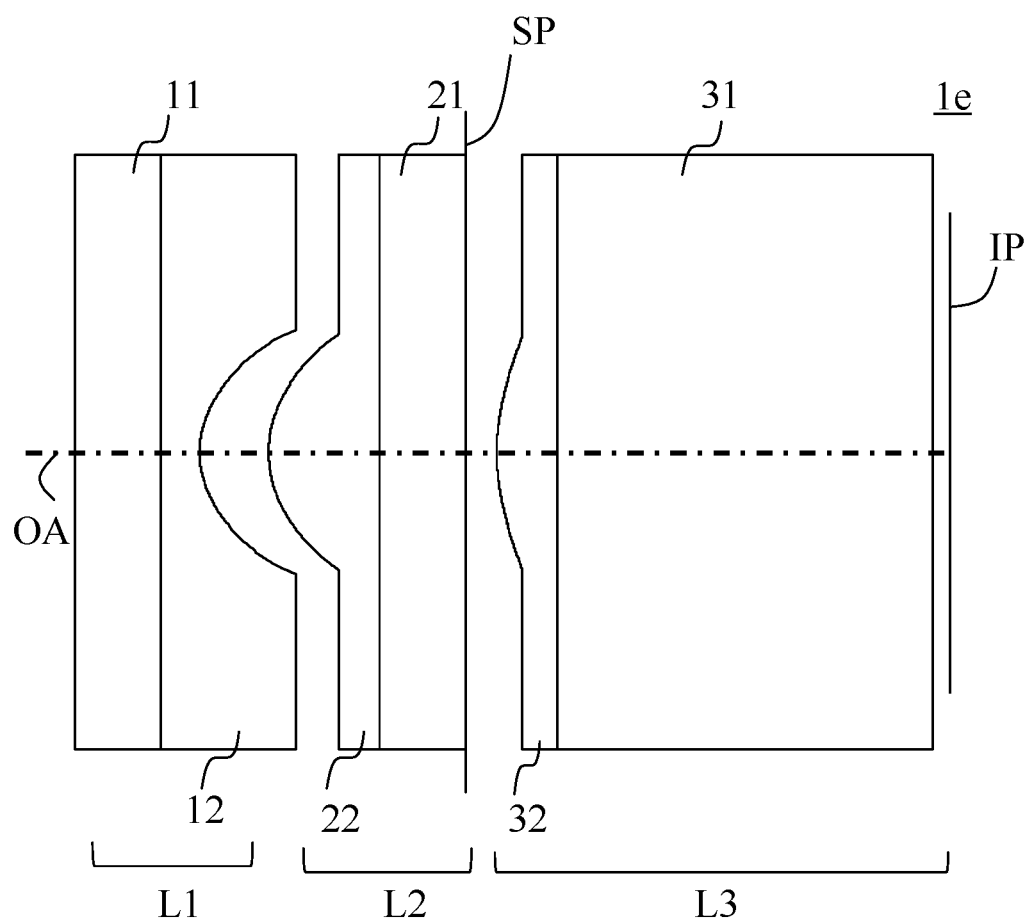
FIG. 9 is a sectional view of an optical system according to Example 5.
Figure 10:
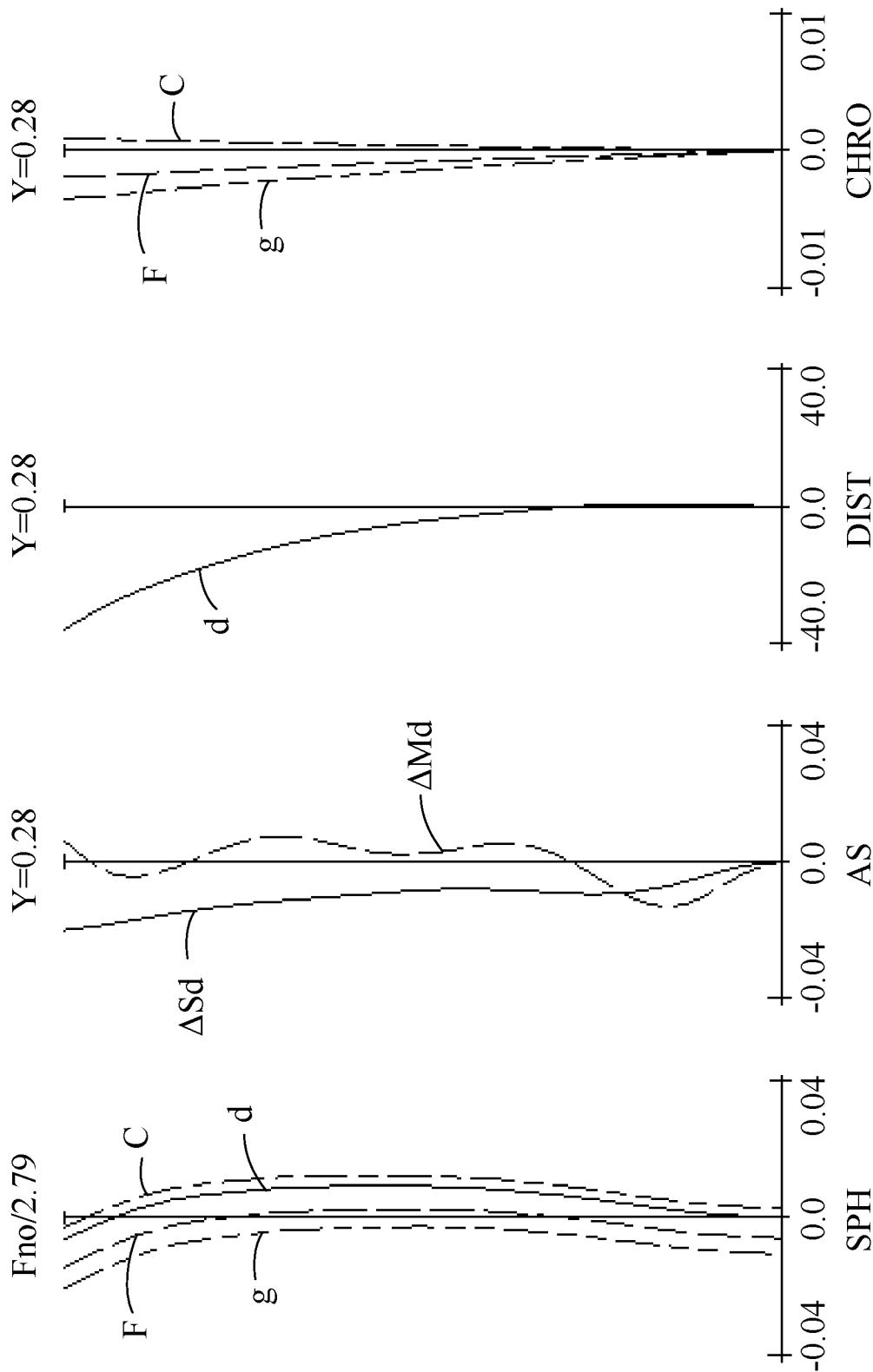
FIGS. 10A to 10D are aberration diagrams of the optical system according to Example 5.

Referring now to FIGS. 9 and 10A to 10D, a description will be given of the optical system 1e according to Example 5 (numerical example 5). As illustrated in FIG. 9, the optical system 1e according to this example has the same basic configuration as that of the optical system 1d of Example 4. In the optical system 1e according to this example, the third substrate 31 is used as the sensor cover glass, and the lens surface of the third lens 32 is formed on the object side of the third substrate 31, and the third substrate 31 serves as the sensor cover glass and the back cover glass. The optical system 1e according to this example has a half angle of view of 57° and an F-number of 2.8, and is an extremely small, bright, and wide-angle optical system. The optical system 1e according to this example is designed to focus on an object at a position 5 mm from the surface closest to the object in the first unit L1.

As illustrated in FIG. 10A, the spherical aberration in this example is less than 0.04 mm. As illustrated in FIG. 10B, the astigmatism in this example is less than 0.04 mm. As illustrated in FIG. 10(C), the distortion in this example is less than 40%. As illustrated in FIG. 10D, the lateral chromatic aberration in this example is less than 0.01 mm. Thus, the optical system 1e according to this example has proper aberrations. The optical system 1e according to this example is an optical system having high manufacturing stability because of the short distance Lar between the first lens and the second substrate.

EXAMPLE 6

Figure 11:
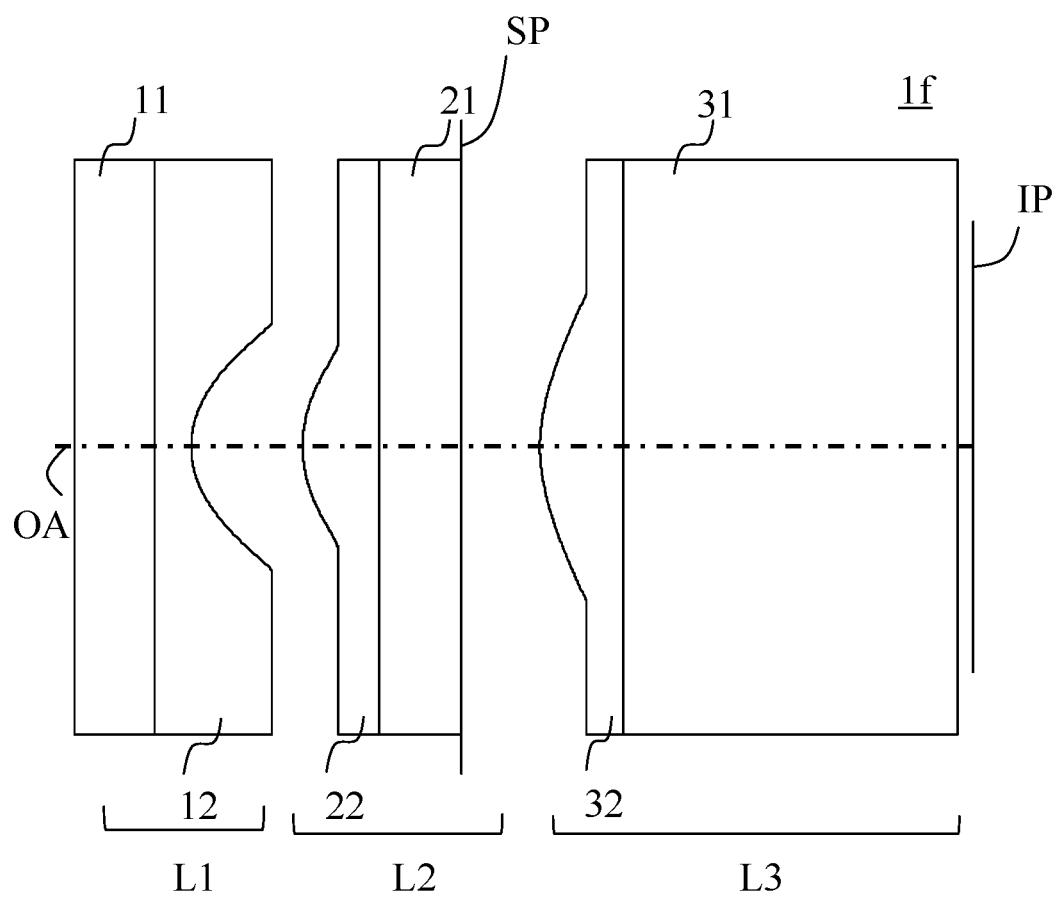
FIG. 11 is a sectional view of an optical system according to Example 6.
Figure 12:
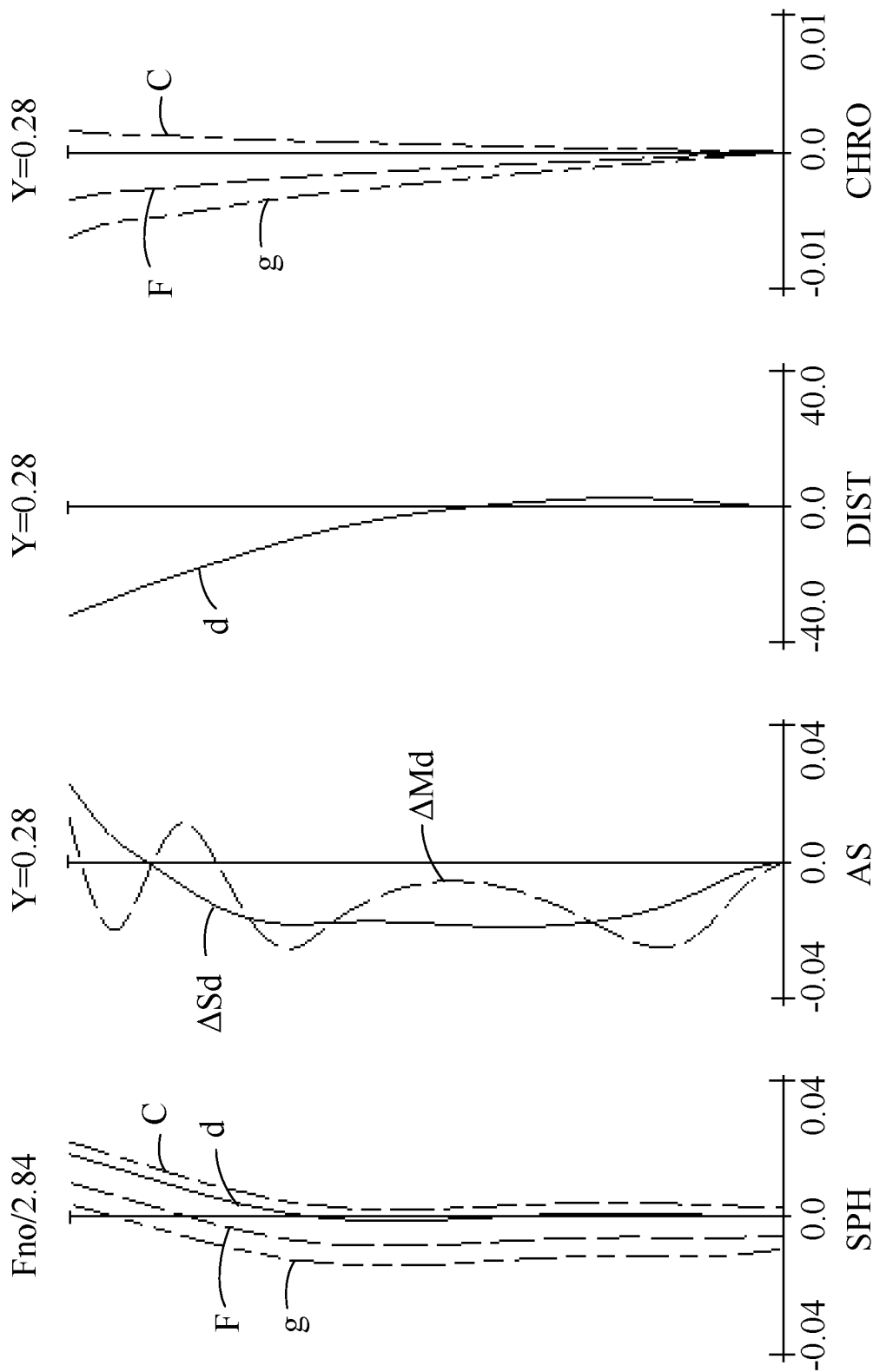
FIGS. 12A to 12D are aberration diagrams of the optical system according to Example 6.

Referring now to FIGS. 11 and 12A to 12D, a description will be given of the optical system 1f according to Example 6 (numerical example 6). As illustrated in FIG. 11, the optical system 1f according to this example has the same basic configuration as that of the optical system 1d of Example 4. In the optical system 1f according to this example, the third substrate 31 is used as the sensor cover glass, and the lens surface of the third lens 32 is formed on the object side of the third substrate 31, and the third substrate 31 serves as the sensor cover glass and the back cover glass. The optical system 1f according to this example has a half angle of view of 61° and an F-number of 2.8, and is an extremely small, bright, and wide-angle optical system. The optical system 1f according to this example is designed to focus on an object at a position 5 mm from the surface closest to the object in the first unit L1.

As illustrated in FIG. 12A, the spherical aberration in this example is less than 0.04 mm. As illustrated in FIG. 12B, the astigmatism in this example is less than 0.04 mm. As illustrated in FIG. 12C, the distortion in this example is less than 40%. As illustrated in FIG. 12D, the lateral chromatic aberration in this example is less than 0.01 mm. Thus, the optical system 1f according to this example has proper aberrations.

EXAMPLE 7

Figure 13:
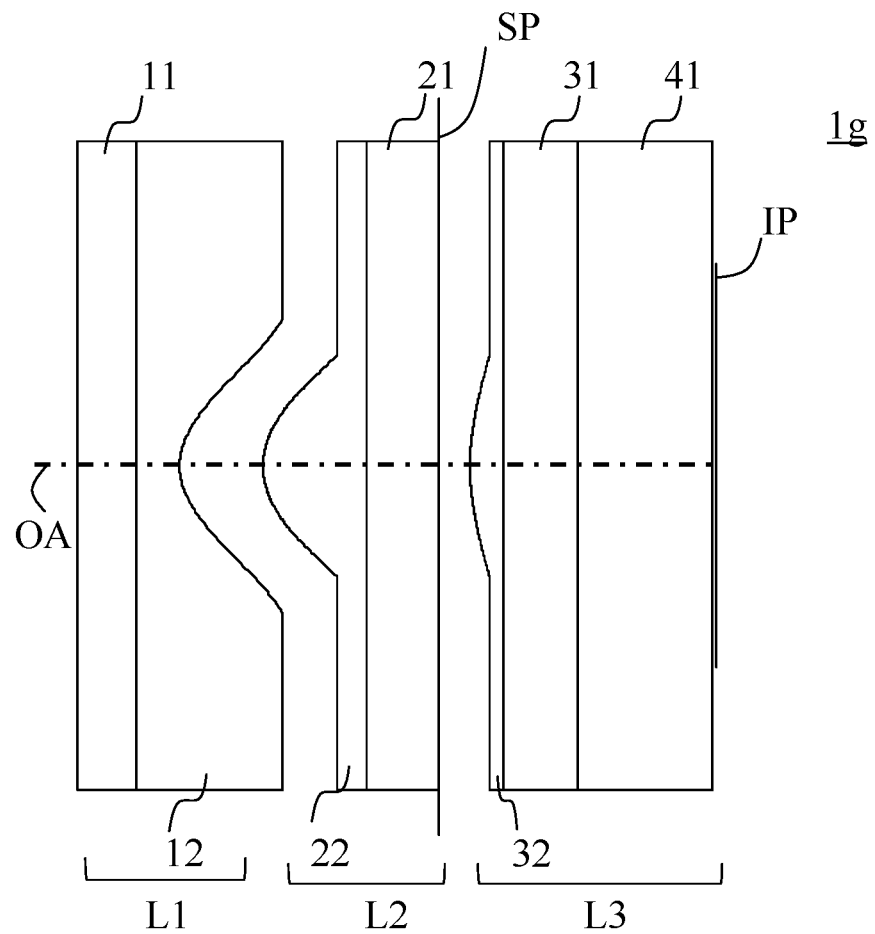
FIG. 13 is a sectional view of an optical system according to Example 7.
Figure 14:
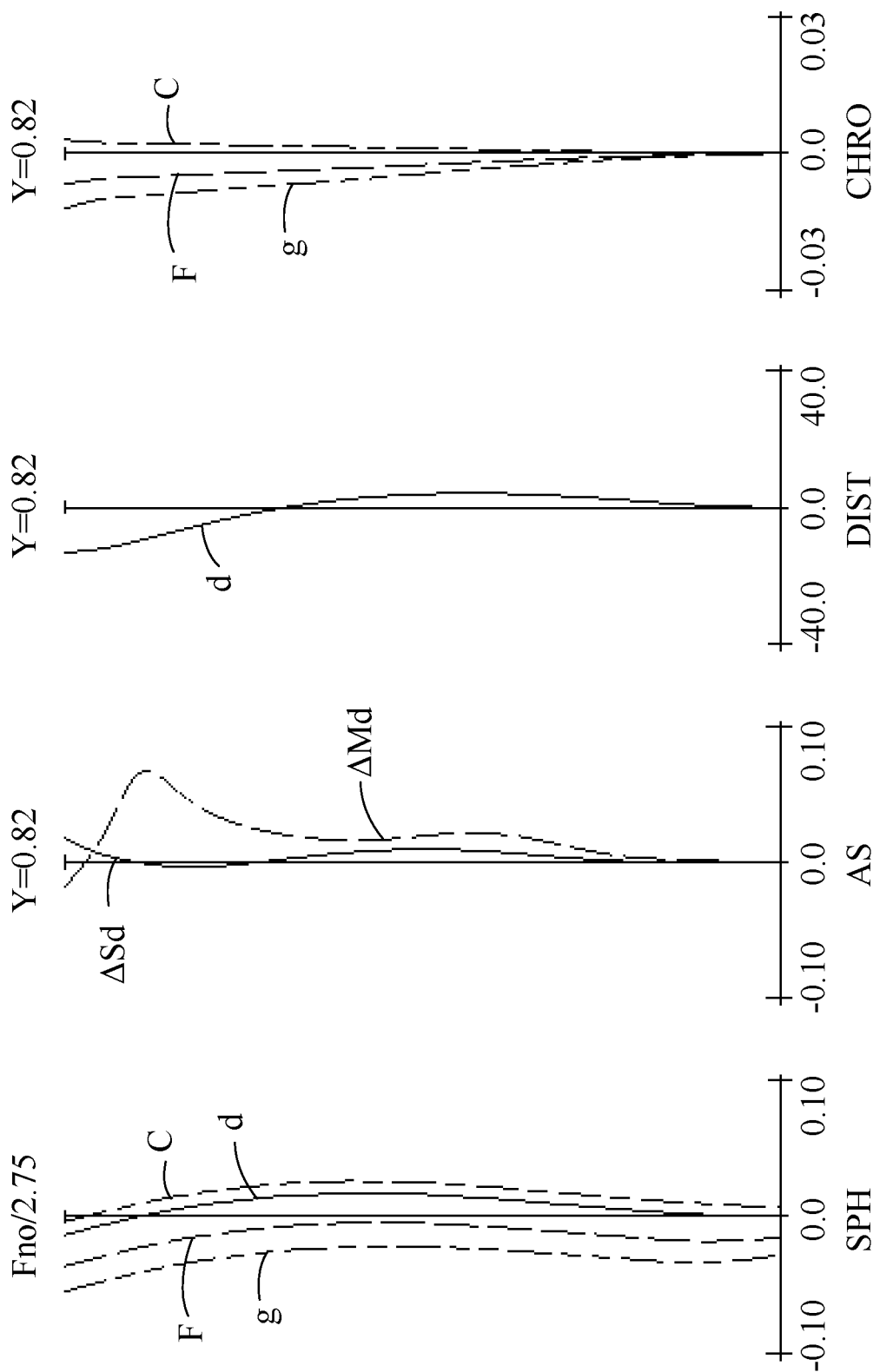
FIGS. 14A to 14D are aberration diagrams of the optical system according to Example 7.

Referring now to FIGS. 13 and 14A to 14D, a description will be given of the optical system 1g according to Example 7 (numerical example 7). As illustrated in FIG. 13, the optical system 1g according to this example has the same basic configuration as that of the optical system 1a of Example 1. The optical system 1g according to this example has an image height of 0.82 mm, a half angle of view of 59°, and an F-number of 2.8, and is an extremely small, bright, and wide-angle optical system. The optical system 1g according to this example is designed to focus on an object at a position 50 mm from the surface closest to the object in the first unit L1.

As illustrated in FIG. 14A, the spherical aberration in this example is less than 0.1 mm. As illustrated in FIG. 14B, the astigmatism in this example is less than 0.1 mm. As illustrated in FIG. 14C, the distortion in this example is less than 40%. As illustrated in FIG. 14(D), the lateral chromatic aberration in this example is less than 0.03 mm. As described above, the optical system 1g according to this example has proper aberrations.

EXAMPLE 8

Figure 15:
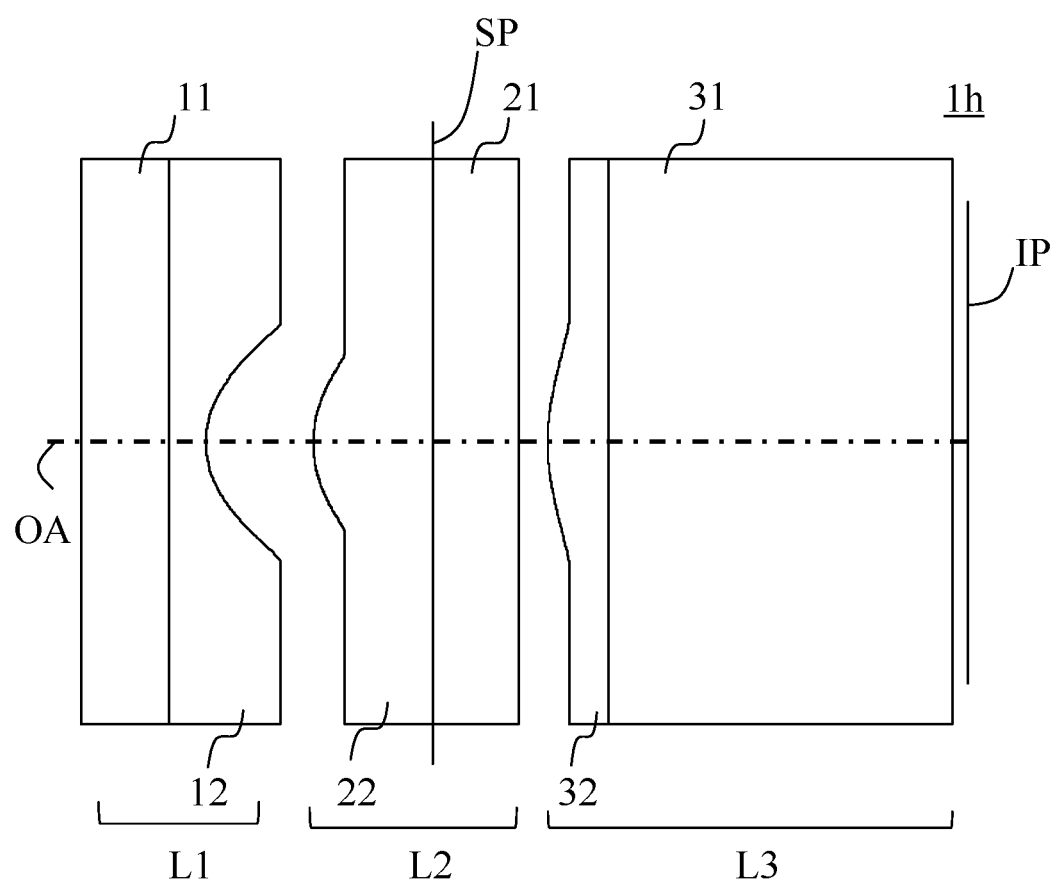
FIG. 15 is a sectional view of an optical system according to Example 8.
Figure 16:
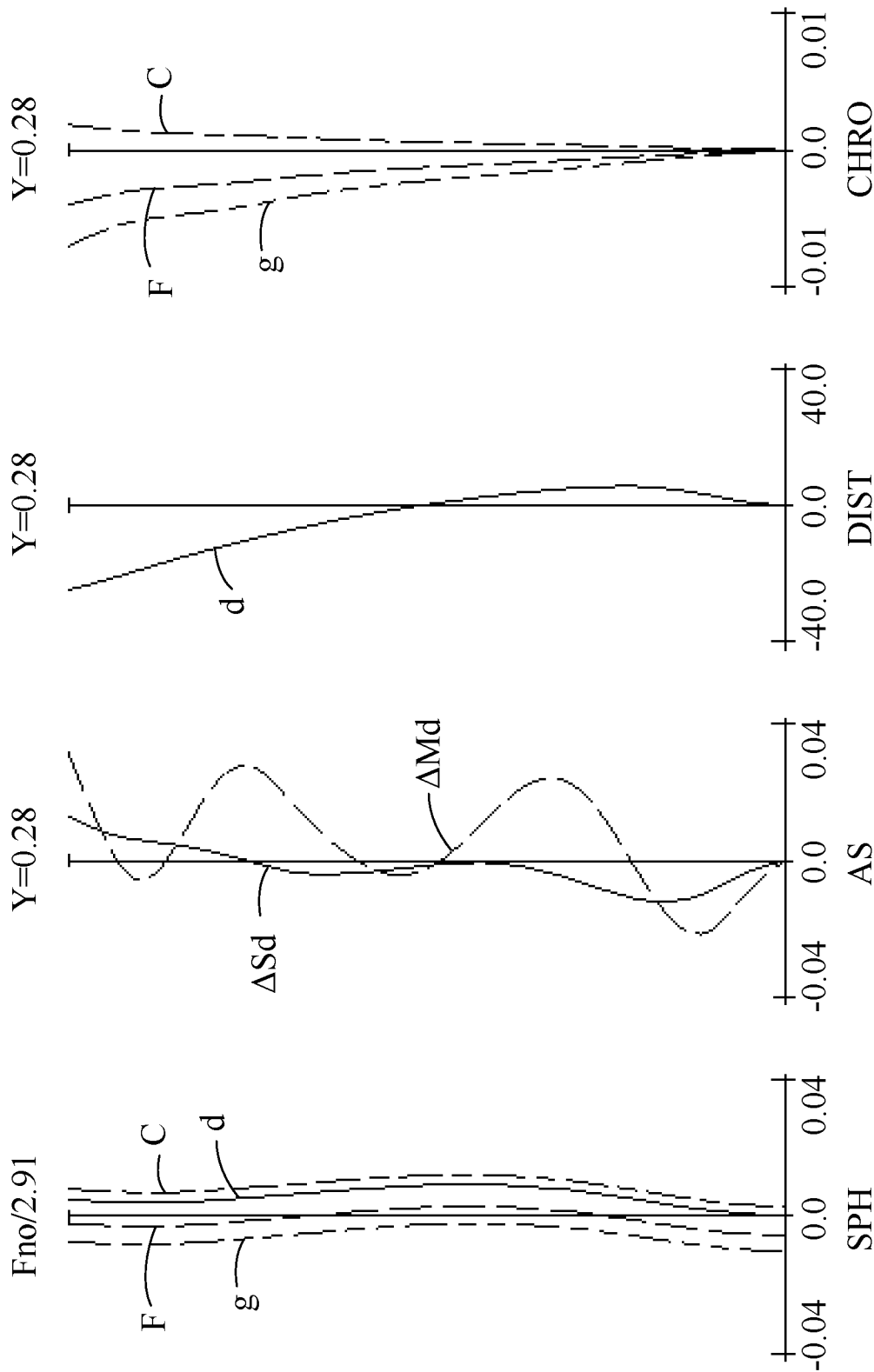
FIGS. 16A to 16D are aberration diagrams of the optical system according to Example 8.

Referring now to FIGS. 15 and 16A to 16D, a description will be given of the optical system 1h according to Example 8 (numerical example 8). As illustrated in FIG. 15, the optical system 1h according to this example has the same basic configuration as that of the optical system 1d of Example 4. In Examples 1 to 7, the diaphragm SP is provided on the image side of the second substrate L21, but in the optical system 1h according to this example, the diaphragm SP is provided on the surface on the object side of the second substrate L21. The optical system 1h according to this example has a half angle of view of 60° and an F-number of 2.9, and is an extremely small, bright, and wide-angle optical system. The optical system 1h according to this example is designed to focus on an object at a position 5 mm from the surface closest to the object in the first unit L1.

As illustrated in FIG. 16A, the spherical aberration in this example is less than 0.04 mm. As illustrated in FIG. 16B, the astigmatism in this example is less than 0.04 mm. As illustrated in FIG. 16C, the distortion in this example is less than 40%. As illustrated in FIG. 16D, the lateral chromatic aberration in this example is less than 0.01 mm. Thus, the optical system 1h according to this example has proper aberrations.

A description will now be given of numerical examples 1 to 8 corresponding to Examples 1 to 8. In each numerical example, r denotes a radius of curvature (mm) of an i-th surface counted from the object side, d denotes an on-axis distance (mm) between an i-th surface and an (i+1)-th surface counted from the object side, and nd and vd are a refractive index and an Abbe number of an i-th optical element for the d-line. The Abbe number vd of a certain material is expressed by:

$$vd = (Nd-1)/(NF-NC)$$

where Nd, NF, and NC are refractive indexes for the d-line (587.6 nm), the F-line (486.1 nm), and the C-line (656.3 nm) in the Fraunhofer lines.

A focal length f (mm) is a value in focusing on an infinity object. BF denotes a backfocus and is a distance from the final surface of the optical system to the image plane. The overall length of the lens is a distance from the first surface to the image plane. An aspherical surface is represented by adding an asterisk * to the surface number. The aspherical shape is expressed as follows:

$$x(h) = \frac{\left(\dfrac{h^2}{r}\right)}{1 + \sqrt{\left\{1 - (1+k)\left(\dfrac{h}{r}\right)^2\right\}}} + A_4 h^4 + A_6 h^6 + A_8 h^8 + A_{10} h^{10} + \ldots$$

where x denotes a displacement amount from the surface apex in the optical axis direction, h denotes a height from the optical axis in the direction perpendicular to the optical axis, r denotes a paraxial radius of curvature, k denotes a conical constant, and Ai (i=4, 6, 8, . . . ) denotes an aspherical coefficient.

The indication of "e±Z" means "10±Z".

NUMERICAL EXAMPLE1

UNIT: mm

Surface Data

| Surface No. | r | d | nd | vd |
|---|---|---|---|---|
| 1 | ∞ | 0.10 | 1.51680 | 64.2 |
| 2 | ∞ | 0.01 | 1.51000 | 57.5 |
| 3* | 0.114 | 0.17 | | |
| 4* | 0.158 | 0.10 | 1.55000 | 44.0 |
| 5 | ∞ | 0.20 | 1.51680 | 64.2 |
| 6 (Diaphragm) | ∞ | 0.07 | | |
| 7* | 0.259 | 0.05 | 1.51000 | 57.5 |
| 8 | ∞ | 0.10 | 1.51680 | 64.2 |
| 9 | ∞ | 0.30 | 1.51680 | 64.2 |
| 10 | ∞ | 0.02 | | |
| Image Plane | ∞ | | | |

ASPHERIC DATA
3rd Surface

K = −1.40126e+000, A4 = 1.74465e+001,
A6 = −6.09448e+001, A8 = 2.54898e+003,
A10 = 1.11764e+005, A12 = −4.94130e+006

4th Surface

K = −2.45619e−001, A4 = −2.46995e+001,
A6 = −3.75404e+002, A8 = −7.60321e+003,
A10 = 9.46804e+005, A12 = −5.15469e+007

7th Surface

K = −1.67841e+001, A4 = 3.69380e+001,
A6 = −1.45726e+003, A8 = 3.14333e+004,
A10 = −4.22638e+004, A12 = −7.51083e+006

| | |
|---|---|
| Focal Length: | 0.24 |
| Fno: | 2.88 |
| Half Angle of View: | 59.0 |
| Image Height: | 0.28 |
| Overall Lens Length: | 1.12 |
| BF: | 0.02 |
| Object Distance: | 10.0 |

NUMERICAL EXAMPLE2

UNIT: mm

Surface Data

| Surface No. | r | d | nd | vd |
|---|---|---|---|---|
| 1 | ∞ | 0.10 | 1.51680 | 64.2 |
| 2 | ∞ | 0.01 | 1.51000 | 57.5 |
| 3* | 0.118 | 0.14 | | |
| 4* | 0.160 | 0.10 | 1.56318 | 39.6 |
| 5 | ∞ | 0.10 | 1.51680 | 64.2 |
| 6 (Diaphragm) | ∞ | 0.09 | | |
| 7* | 0.232 | 0.06 | 1.51000 | 57.5 |
| 8 | ∞ | 0.10 | 1.51680 | 64.2 |
| 9 | ∞ | 0.30 | 1.51680 | 64.2 |
| 10 | ∞ | 0.02 | | |
| Image Plane | ∞ | | | |

ASPHERIC DATA
3rd Surface

K = −8.11341e−001, A4 = −1.78031e+001, A6 = 1.00708e+003,
A8 = 3.94833e+003, A10 = −2.85870e+006, A12 = 5.07388e+007

4th Surface

K = −5.24295e+000, A4 = 1.20898e+002, A6 = −4.98544e+003,
A8 = 1.15921e+005, A10 = −3.00410e+006, A12 = 3.92272e+007

7th Surface

K = −1.80560e+001, A4 = 4.34353e+001, A6 = −1.72697e+003,
A8 = −5.87235e+004, A10 = 7.12574e+006, A12 = −1.59311e+008

| | |
|---|---|
| Focal Length: | 0.24 |
| Fno: | 2.88 |
| Half Angle of View: | 59.0 |
| Image Height: | 0.28 |
| Overall Lens Length: | 1.02 |
| BF: | 0.02 |
| Object Distance: | 10.0 |

NUMERICAL EXAMPLE3

UNIT: mm

Surface Data

| Surface No. | r | d | nd | vd |
|---|---|---|---|---|
| 1 | ∞ | 0.20 | 1.51680 | 64.2 |
| 2 | ∞ | 0.01 | 1.51000 | 57.5 |
| 3* | 0.130 | 0.18 | | |
| 4* | 0.205 | 0.13 | 1.55000 | 44.0 |
| 5 | ∞ | 0.20 | 1.51680 | 64.2 |
| 6 (Diaphragm) | ∞ | 0.04 | | |
| 7* | 0.286 | 0.06 | 1.53000 | 56.0 |
| 8 | ∞ | 0.20 | 1.51680 | 64.2 |
| 9 | ∞ | 0.40 | 1.51680 | 64.2 |
| 10 | ∞ | 0.02 | | |
| Image Plane | ∞ | | | |

ASPHERIC DATA
3rd Surface

K = −1.16949e+000, A4 = 2.17835e+001, A6 = 5.85940e+002,
A8 = 1.97923e+004, A10 = −1.54923e+006, A12 = 3.88932e+007

4th Surface

K = 2.34627e−001, A4 = −8.16279e+000, A6 = −5.63709e+002,
A8 = 1.06071e+004, A10 = 3.25696e+005, A12 = −2.41692e+007

7th Surface

K = −3.76746e+001, A4 = 1.01499e+002, A6 = −8.41613e+003,
A8 = 7.54769e+003, A10 = 4.76035e+007, A12 = −2.17281e+009

| | |
|---|---|
| Focal Length: | 0.28 |
| Fno: | 2.88 |
| Half Angle of View: | 54.0 |
| Image Height: | 0.28 |
| Overall Lens Length: | 1.43 |
| BF | 0.02 |
| Object Distance | 10.0 |

NUMERICAL EXAMPLE4

UNIT: mm

Surface Data

| Surface No. | r | d | nd | vd | Effective Diameter |
|---|---|---|---|---|---|
| 1 | ∞ | 0.100 | 1.51680 | 64.2 | 0.62 |
| 2 | ∞ | 0.045 | 1.52290 | 50.3 | 0.48 |
| 3* | 0.0846 | 0.120 | | | 0.28 |
| 4* | 0.1231 | 0.141 | 1.52290 | 50.3 | 0.25 |
| 5 | ∞ | 0.100 | 1.51680 | 64.2 | 0.19 |
| 6 (Diaphragm) | ∞ | 0.054 | | | 0.12 |
| 7* | 0.2286 | 0.072 | 1.52290 | 50.3 | 0.27 |
| 8 | ∞ | 0.400 | 1.51680 | 64.2 | 0.30 |
| 9 | ∞ | 0.020 | | | 0.55 |
| Image Plane | ∞ | | | | |

ASPHERIC DATA

3rd Surface $K = -6.21168e+00, A4 = 6.25636e+02, A6 = -8.47952e+04,$
$A8 = 7.80586e+06, A10 = -4.40616e+08, A12 = 1.38205e+10,$
$A14 = -1.84957e+11$ 4th Surface $K = -4.15041e+00, A4 = 2.01549e+02, A6 = -1.89467e+04,$
$A8 = 1.87535e+06, A10 = -1.38040e+08, A12 = 5.97522e+09,$
$A14 = -1.13123e+11$ 7th Surface $K = -5.85227e+01, A4 = 2.60048e+02, A6 = -5.58127e+04,$
$A8 = 7.10305e+06, A10 = -5.13511e+08, A12 = 1.94389e+10,$
$A14 = -2.98356e+11$

| | |
|---|---|
| Focal Length: | 0.217 |
| Fno: | 2.83 |
| Half Angle of View: | 59.0 |
| Image Height: | 0.28 |
| Overall Lens Length: | 1.05 |
| BF: | 0.020 |
| Object Distance: | 5.0 |

NUMERICAL EXAMPLE5

UNIT: mm

Surface Data

| Surface No. | r | d | nd | vd | Effective Diameter |
|---|---|---|---|---|---|
| 1 | ∞ | 0.100 | 1.51680 | 64.2 | 0.62 |
| 2 | ∞ | 0.045 | 1.52290 | 50.3 | 0.49 |
| 3* | 0.1087 | 0.081 | | | 0.29 |
| 4* | 0.1272 | 0.130 | 1.52290 | 50.3 | 0.27 |
| 5 | ∞ | 0.100 | 1.51680 | 64.2 | 0.23 |
| 6 (Diaphragm) | ∞ | 0.037 | | | 0.13 |
| 7* | 0.2355 | 0.070 | 1.52290 | 50.3 | 0.25 |
| 8 | ∞ | 0.436 | 1.51680 | 64.2 | 0.28 |
| 9 | ∞ | 0.020 | | | 0.54 |
| Image Plane | ∞ | | | | |

ASPHERIC DATA

3rd Surface $K = -7.43588e+00, A4 = 4.87017e+02, A6 = -6.30018e+04,$
$A8 = 5.88716e+06, A10 = -3.17706e+08, A12 = 8.90173e+09,$
$A14 = -9.27729e+10$ 4th Surface $K = -1.29842e+00, A4 = 3.07945e+01, A6 = -2.42278e+03,$
$A8 = 4.47425e+05, A10 = -3.15142e+07, A12 = 1.04795e+09,$
$A14 = -1.02518e+10$ 7th Surface $K = -4.78137e+01, A4 = 2.30855e+02, A6 = -4.83783e+04,$
$A8 = 6.29551e+06, A10 = -4.66358e+08, A12 = 1.79953e+10,$
$A14 = -2.79997e+11$

| | |
|---|---|
| Focal Length: | 0.277 |
| Fno: | 2.79 |
| Half Angle of View: | 57.0 |
| Image Height: | 0.28 |
| Overall Lens Length: | 1.02 |
| BF: | 0.02 |
| Object Distance: | 5.0 |

NUMERICAL EXAMPLE6

UNIT: mm

Surface Data

| Surface No. | r | d | nd | vd | Effective Diameter |
|---|---|---|---|---|---|
| 1 | ∞ | 0.100 | 1.51680 | 64.2 | 0.65 |
| 2 | ∞ | 0.045 | 1.51500 | 54.0 | 0.51 |
| 3* | 0.1149 | 0.140 | | | 0.31 |
| 4* | 0.1755 | 0.096 | 1.51500 | 54.0 | 0.23 |
| 5 | ∞ | 0.100 | 1.51680 | 64.2 | 0.19 |
| 6 (Diaphragm) | ∞ | 0.098 | | | 0.12 |
| 7* | 0.1943 | 0.105 | 1.51500 | 54.0 | 0.38 |
| 8 | ∞ | 0.414 | 1.51680 | 64.2 | 0.40 |
| 9 | ∞ | 0.020 | | | 0.55 |
| Image Plane | ∞ | | | | |

ASPHERIC DATA

3rd Surface $K = -8.38246e+00, A4 = 4.47212e+02, A6 = -4.82082e+04,$
$A8 = 3.54964e+06, A10 = -1.58303e+08, A12 = 3.76729e+09,$
$A14 = -3.72323e+10$ 4th Surface $K = -1.35880e+00, A4 = 1.56995e+02, A6 = -4.30232e+04,$
$A8 = 6.73782e+06, A10 = -5.77854e+08, A12 = 2.48373e+10,$
$A14 = -4.33446e+11$ 7th Surface $K = -2.10248e+01, A4 = 1.20066e+02, A6 = -1.10557e+04,$
$A8 = 6.07621e+05, A10 = -1.93372e+07, A12 = 3.27476e+08,$
$A14 = -2.27986e+09$

| | |
|---|---|
| Focal Length: | 0.226 |
| Fno: | 2.84 |
| Half Angle of View: | 61.1 |
| Image Height: | 0.28 |
| Overall Lens Length: | 1.12 |
| BF: | 0.02 |
| Object Distance: | 5.0 |

NUMERICAL EXAMPLE 7

UNIT: mm

Surface Data

| Surface No. | r | d | nd | vd | Effective Diameter |
|---|---|---|---|---|---|
| 1 | ∞ | 0.240 | 1.51680 | 64.2 | 2.35 |
| 2 | ∞ | 0.176 | 1.52290 | 50.3 | 2.02 |
| 3* | 0.2457 | 0.341 | | | 1.20 |
| 4* | 0.2957 | 0.418 | 1.52290 | 50.3 | 0.91 |
| 5 | ∞ | 0.300 | 1.51680 | 64.2 | 0.74 |
| 6 (Diaphragm) | ∞ | 0.122 | | | 0.27 |
| 7* | 0.7245 | 0.135 | 1.52290 | 50.3 | 0.83 |
| 8 | ∞ | 0.300 | 1.51680 | 64.2 | 0.88 |
| 9 | ∞ | 0.553 | 1.51680 | 64.2 | 1.14 |
| 10 | ∞ | 0.020 | | | 1.62 |
| Image Plane | ∞ | | | | |

ASPHERIC DATA
3rd Surface $K = -1.82995e+00, A4 = 1.95941e+00, A6 = -9.41015e+00, A8 = 1.22664e\ A10 = -1.03796e+01, A12 = 2.50580e+01, A14 = -1.99537e+01$ 4th Surface $K = -2.78973e+00, A4 = 7.70474e+00, A6 = -7.05350e+01, A8 = 6.41973e+02, A10 = -4.32391e+03, A12 = 1.49156e+04, A14 = -1.96470e+04$ 7th Surface $K = -4.43879e+01, A4 = 3.13426e+00, A6 = -4.10059e+01, A8 = 3.38398e+02, A10 = -1.58008e+03, A12 = 3.73365e+03, A14 = -3.53936e+03$

| | |
|---|---|
| Focal Length: | 0.565 |
| Fno: | 2.75 |
| Half Angle of View: | 59.0 |
| Image Height: | 0.82 |
| Overall Lens Length: | 2.60 |
| BF: | 0.020 |
| Object Distance: | 50.0 |

NUMERICAL EXAMPLE 8

UNIT: mm

Surface Data

| Surface No. | r | d | nd | vd | Effective Diameter |
|---|---|---|---|---|---|
| 1 | ∞ | 0.100 | 1.51680 | 64.2 | 0.59 |
| 2 | ∞ | 0.045 | 1.52290 | 50.3 | 0.45 |
| 3* | 0.0984 | 0.125 | | | 0.27 |
| 4* | 0.1397 | 0.138 | 1.52290 | 50.3 | 0.19 |
| 5 (Diaphragm) | ∞ | 0.100 | 1.51680 | 64.2 | 0.11 |
| 6 | ∞ | 0.033 | | | 0.19 |
| 7* | 0.2093 | 0.071 | 1.52290 | 50.3 | 0.28 |
| 8 | ∞ | 0.400 | 1.51680 | 64.2 | 0.30 |
| 9 | ∞ | 0.020 | | | 0.55 |
| Image Plane | ∞ | | | | |

ASPHERIC DATA
3rd Surface $K = -1.23301e+01, A4 = 7.56038e+02, A6 = -1.22104e+05, A8 = 1.32431e+07, A10 = -8.55926e+08, A12 = 2.91280e+10, A14 = -4.02217e+11$ 4th Surface $K = -3.52848e+00, A4 = 1.55637e+02, A6 = -1.82661e+04, A8 = 3.72846e+06, A10 = -6.48173e+08, A12 = 5.88096e+10, A14 = -2.17851e+12$ 7th Surface $K = -4.99166e+01, A4 = 2.46197e+02, A6 = -4.89127e+04, A8 = 5.57700e+06, A10 = -3.64668e+08, A12 = 1.25259e+10, A14 = -1.75004e+11$

| | |
|---|---|
| Focal Length: | 0.215 |
| Fno: | 2.91 |
| Half Angle of View: | 59.7 |
| Image Height: | 0.28 |
| Overall Lens Length: | 1.03 |
| BF: | 0.020 |
| Object Distance: | 5.0 |

Table 1 summarizes numerical values regarding the inequalities (1) to (8) in each numerical example.

TABLE 1

| Inequality | Numerical Example | | | | | | | |
|---|---|---|---|---|---|---|---|---|
| | 1 | 2 | 3 | 4 | 5 | 6 | 7 | 8 |
| f | 0.238 | 0.235 | 0.284 | 0.217 | 0.277 | 0.226 | 0.565 | 0.215 |
| f1 | −0.224 | −0.230 | −0.255 | −0.162 | −0.208 | −0.223 | −0.470 | −0.188 |
| f2 | 0.287 | 0.283 | 0.372 | 0.235 | 0.243 | 0.341 | 0.566 | 0.267 |
| f3 | 0.508 | 0.455 | 0.539 | 0.437 | 0.450 | 0.377 | 1.386 | 0.400 |
| d | 0.0657 | 0.0865 | 0.0379 | 0.0538 | 0.0366 | 0.0981 | 0.1219 | 0.1327 |
| L | 0.424 | 0.424 | 0.624 | 0.420 | 0.456 | 0.434 | 0.873 | 0.420 |
| d1 | 0.100 | 0.100 | 0.200 | 0.100 | 0.100 | 0.100 | 0.240 | 0.100 |
| d2 | 0.200 | 0.100 | 0.200 | 0.100 | 0.100 | 0.100 | 0.300 | 0.100 |
| Lar | 0.269 | 0.240 | 0.306 | 0.261 | 0.211 | 0.236 | 0.759 | 0.263 |
| f2/f | 1.204 | 1.206 | 1.310 | 1.086 | 0.877 | 1.510 | 1.002 | 1.240 |
| f3/f1 | −2.272 | −1.976 | −2.111 | −2.700 | −2.167 | −1.691 | −2.949 | −2.127 |
| d/f | 0.276 | 0.368 | 0.133 | 0.248 | 0.132 | 0.435 | 0.216 | 0.616 |
| L/f | 1.778 | 1.804 | 2.195 | 1.937 | 1.644 | 1.924 | 1.546 | 1.949 |
| (f2 − f1)/f3 | 1.005 | 1.129 | 1.165 | 0.909 | 1.001 | 1.495 | 0.747 | 1.137 |
| f3/f | 2.130 | 1.936 | 1.896 | 2.016 | 1.623 | 1.672 | 2.454 | 1.858 |
| d/f3 | 0.129 | 0.190 | 0.070 | 0.123 | 0.081 | 0.260 | 0.088 | 0.332 |
| Lar/(d1 + d2) | 0.896 | 1.200 | 0.765 | 1.306 | 1.054 | 1.180 | 1.405 | 1.316 |

The optical system according to each example is suitable for an imaging optical system used for a built-in camera of an electronic apparatus such as a mobile phone, a smartphone, or a wearable terminal, and an objective optical system for an endoscope, or the like.

EXAMPLE 9

Figure 18:
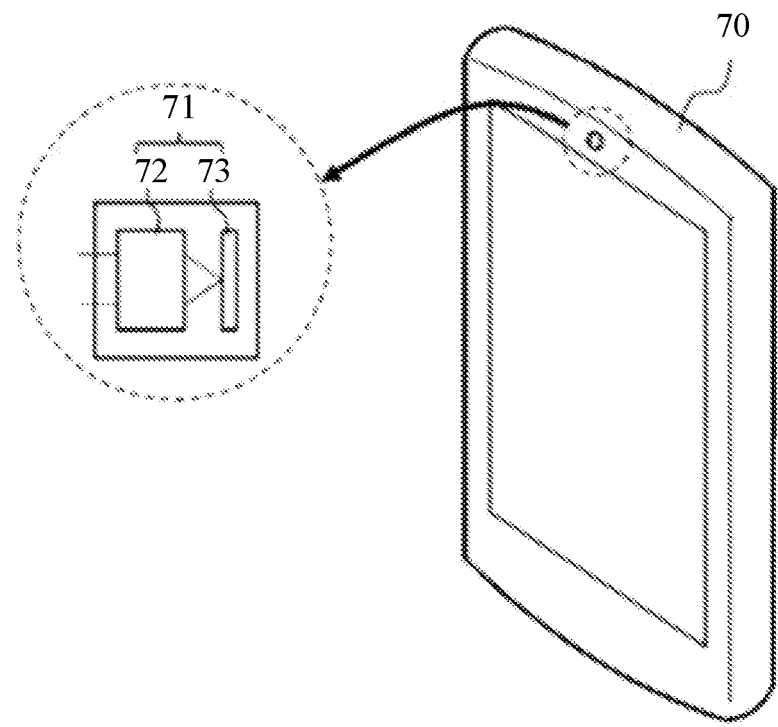
FIG. 18 is a schematic view of principal part of an electronic apparatus according to Example 5.

Referring now to FIG. 18, a description will be given of an electronic apparatus according to Example 9 of the present invention. FIG. 18 is a schematic view of principal part of the electronic apparatus (smartphone 70) according to this example. The smartphone 70 includes an image pickup apparatus 71 as a front camera module. The image pickup apparatus 71 includes an optical system 72 corresponding to any of the optical systems according to Examples 1 to 8, and an image sensor 73 that receives image light formed by the optical system 72. As described above, applying the optical system according to each example to an image pickup apparatus such as a smartphone can realize a small image pickup apparatus having high optical performance.

EXAMPLE 10

Figure 19:
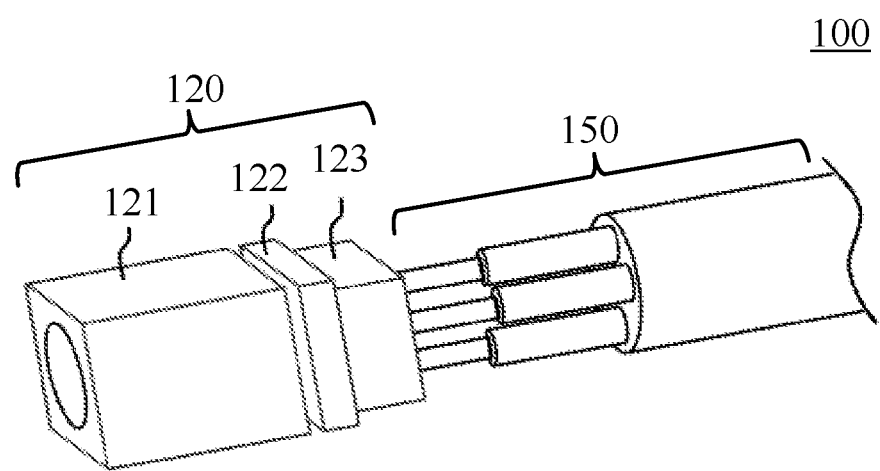
FIG. 19 is a schematic view of principal part of an image pickup apparatus according to Example 6.

Referring now to FIG. 19, a description will be given of an image pickup apparatus according to Example 10 of the present invention. FIG. 19 is a schematic view of principal part of an image pickup apparatus 100 according to this example. The image pickup apparatus 100 is used for a small endoscope, and includes a camera head 120 and an electric cable 150. The camera head 120 includes a lens housing 121 including any of the optical systems according to Examples 1 to 8, an image sensor 122, and a ceramic substrate 123. Wires of the electric cable 150 are connected to the image sensor 122 via the ceramic substrate 123. Thus, applying the optical system of each of the examples to the image pickup apparatus of the endoscope can realize a small image pickup apparatus having high optical performance.

Each example can a small and inexpensive optical system having high optical performance, and an image pickup apparatus the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-003690, filed on Jan. 13, 2021, and No. 2021-175257, filed on Oct. 27, 2021 which are hereby incorporated by reference herein in their entirety.

What is claimed is:

1. An optical system comprising, in order from an object side to an image side, a first unit, a second unit, and a third unit,
wherein the first unit includes a first substrate, and a first lens having a negative refractive power and disposed on the image side of the first substrate,
wherein the second unit includes a second substrate, and a second lens having a positive refractive power and disposed on the object side of the second substrate,
wherein the third unit includes a third substrate, and a third lens having a positive refractive power and disposed on the object side of the third substrate,
wherein the third unit includes no other lenses than the third lens.

2. The optical system according to claim 1, wherein the second unit further includes a diaphragm.

3. The optical system according to claim 2, wherein the diaphragm is disposed on the second substrate.

4. The optical system according to claim 2, wherein the following inequality is satisfied:

$$0.10 < d/f < 0.50$$

where d is a distance from the diaphragm to the third lens on an optical axis, and f is a focal length of the optical system.

5. The optical system according to claim 2, wherein the following inequality is satisfied:

$$0.07 < d/f < 0.65$$

where d is a distance from the diaphragm to the third lens on an optical axis, and f is a focal length of the optical system.

6. The optical system according to claim 2, wherein the following inequality is satisfied:

$$0.03 < d/f3 < 0.40$$

where d is a distance from the diaphragm to the third lens on an optical axis, and f3 is a focal length of the third lens.

7. The optical system according to claim 1, wherein the following inequality is satisfied:

$$1.00 < f2/f < 1.50$$

where f2 is a focal length of the second lens, and f is a focal length of the optical system.

8. The optical system according to claim 1, wherein the following inequality is satisfied:

$$0.60 < f2/f < 1.60$$

where f2 is a focal length of the second lens, and f is a focal length of the optical system.

9. The optical system according to claim 1, wherein the following inequality is satisfied:

$$-2.50 < f3/f1 < -1.80$$

where f1 is a focal length of the first lens, and f3 is a focal length of the third lens.

10. The optical system according to claim 1, wherein the following inequality is satisfied:

$$-3.50 < f3/f1 < -1.50$$

where f1 is a focal length of the first lens, and f3 is a focal length of the third lens.

11. The optical system according to claim 1, wherein the following inequality is satisfied:

$$1.20 < L/f < 2.40$$

where L is a distance from the third lens to the image plane, and f is a focal length of the optical system.

12. The optical system according to claim 1, wherein the following inequality is satisfied:

$$1.00 < L/f < 2.40$$

where L is a distance from the third lens to the image plane, and f is a focal length of the optical system.

13. The optical system according to claim 1, wherein the following inequality is satisfied:

$$0.30 < (f2-f1)/f3 < 1.60$$

where f1 is a focal length of the first lens, f2 is a focal length of the second lens, and f3 is a focal length of the third lens.

14. The optical system according to claim 1, wherein the following inequality is satisfied:

$$1.50 < f3/f < 3.00$$

where f3 is a focal length of the third lens, and f is a focal length of the optical system.

15. The optical system according to claim 1, wherein the following inequality is satisfied:

$$0.60 < Lar/(d1+d2) < 2.00$$

wherein d1 is a thickness of the first substrate, d2 is a thickness of the second substrate, and Lar is a distance from a surface on the image side of the first lens to a surface on the object side of the second substrate.

16. The optical system according to claim 1, wherein the first substrate and the first lens have refractive indexes different from each other.

17. The optical system according to claim 1, wherein the second substrate and the second lens have refractive indexes different from each other.

18. The optical system according to claim 1, wherein the third substrate and the third lens have refractive indexes different from each other.

19. An image pickup apparatus comprising:
the optical system according to claim 1; and
an image sensor configured to receive an image formed by the optical system.

20. The optical system according to claim 1, wherein the third unit includes a fourth substrate disposed on the image side of the third substrate.

* * * * *